United States Patent
Nooner et al.

(10) Patent No.: US 12,304,054 B2
(45) Date of Patent: May 20, 2025

(54) TOOL HOLDER

(71) Applicant: Midwest Innovative Products, LLC, Joliet, IL (US)

(72) Inventors: Bryan Nooner, Joliet, IL (US); Robert Zajeski, Homer Glen, IL (US); Joshua Nooner, Mokena, IL (US)

(73) Assignee: Midwest Innovative Products, LLC

( * ) Notice: Subject to any disclaimer, the term of this patent is extended or adjusted under 35 U.S.C. 154(b) by 0 days.

(21) Appl. No.: 18/428,733

(22) Filed: Jan. 31, 2024

(65) Prior Publication Data

US 2024/0165787 A1    May 23, 2024

Related U.S. Application Data

(63) Continuation of application No. 17/571,258, filed on Jan. 7, 2022, now Pat. No. 11,904,453, which is a continuation-in-part of application No. 29/811,911, filed on Oct. 18, 2021.

(60) Provisional application No. 63/257,490, filed on Oct. 19, 2021.

(51) Int. Cl.
*B05B 7/02*    (2006.01)
*B23B 47/28*   (2006.01)
*B25H 3/00*    (2006.01)
*F16M 13/02*   (2006.01)

(52) U.S. Cl.
CPC ............. *B25H 3/006* (2013.01); *B23B 47/28* (2013.01); *B25H 3/003* (2013.01); *F16M 13/02* (2013.01); *F16M 13/022* (2013.01)

(58) Field of Classification Search
CPC ........ B25H 3/006; B25H 3/003; B23B 47/28; F16M 13/02; F16M 13/022
See application file for complete search history.

(56) References Cited

U.S. PATENT DOCUMENTS

| | | | | |
|---|---|---|---|---|
| 4,097,705 A | * | 6/1978 | Harvell ................ | H01H 9/063 200/321 |
| 4,406,064 A | * | 9/1983 | Goss ..................... | B25H 3/006 30/340 |
| 5,160,092 A | * | 11/1992 | Rose ..................... | B05B 15/00 239/530 |
| 5,699,968 A | * | 12/1997 | Hung .................... | B05B 12/002 239/526 |
| 6,193,125 B1 | | 2/2001 | Grover | |
| 7,306,052 B2 | * | 12/2007 | Vahabi-Nejad ........ | B25C 7/00 173/217 |

(Continued)

FOREIGN PATENT DOCUMENTS

| | | |
|---|---|---|
| CN | 111994439 | 11/2020 |
| WO | 2023069360 | 4/2023 |

*Primary Examiner* — Amy J. Sterling
(74) *Attorney, Agent, or Firm* — MCANDREWS HELD & MALLOY, LTD

(57) ABSTRACT

A tool holder for holding a tool includes a body and a mount. The body includes an interior region configured to receive the tool, wherein the tool defines a primary axis. The mount includes an angled portion, wherein the mount is coupled to the body, wherein the mount is configured to be secured to an object, and wherein the object defines a primary axis. The mount maintains the body in an orientation such that when the body receives the tool and mount is secured to the object, the primary axis of the tool and the primary axis of the object form an oblique angle.

20 Claims, 26 Drawing Sheets

(56) References Cited

U.S. PATENT DOCUMENTS

| | | | |
|---|---|---|---|
| 7,455,001 B1* | 11/2008 | Waters | B25H 3/00 |
| | | | 81/489 |
| 8,443,913 B2* | 5/2013 | Nagasaka | B25F 5/02 |
| | | | 173/171 |
| 9,186,788 B2* | 11/2015 | Keith | B25F 5/02 |
| 11,559,879 B2* | 1/2023 | Machida | A45F 5/00 |
| 11,904,453 B2 | 4/2024 | Nooner et al. | |
| 2003/0160075 A1 | 8/2003 | Musarella | |
| 2007/0228190 A1* | 10/2007 | Tanner | B05B 1/302 |
| | | | 239/526 |
| 2008/0169396 A1* | 7/2008 | Heen | A45F 5/02 |
| | | | 248/309.1 |
| 2009/0314813 A1 | 12/2009 | Woolery | |
| 2012/0085560 A1* | 4/2012 | Kuroyanagi | B25F 5/02 |
| | | | 248/692 |
| 2013/0306690 A1* | 11/2013 | Vuckov | A45C 11/00 |
| | | | 224/242 |
| 2014/0346257 A1* | 11/2014 | Reetz, III | B05B 12/0026 |
| | | | 239/526 |
| 2016/0167219 A1 | 6/2016 | Cho | |
| 2018/0051963 A1* | 2/2018 | Kushneryk | G08B 15/02 |
| 2020/0185162 A1* | 6/2020 | Chiasson | H01H 3/20 |

* cited by examiner

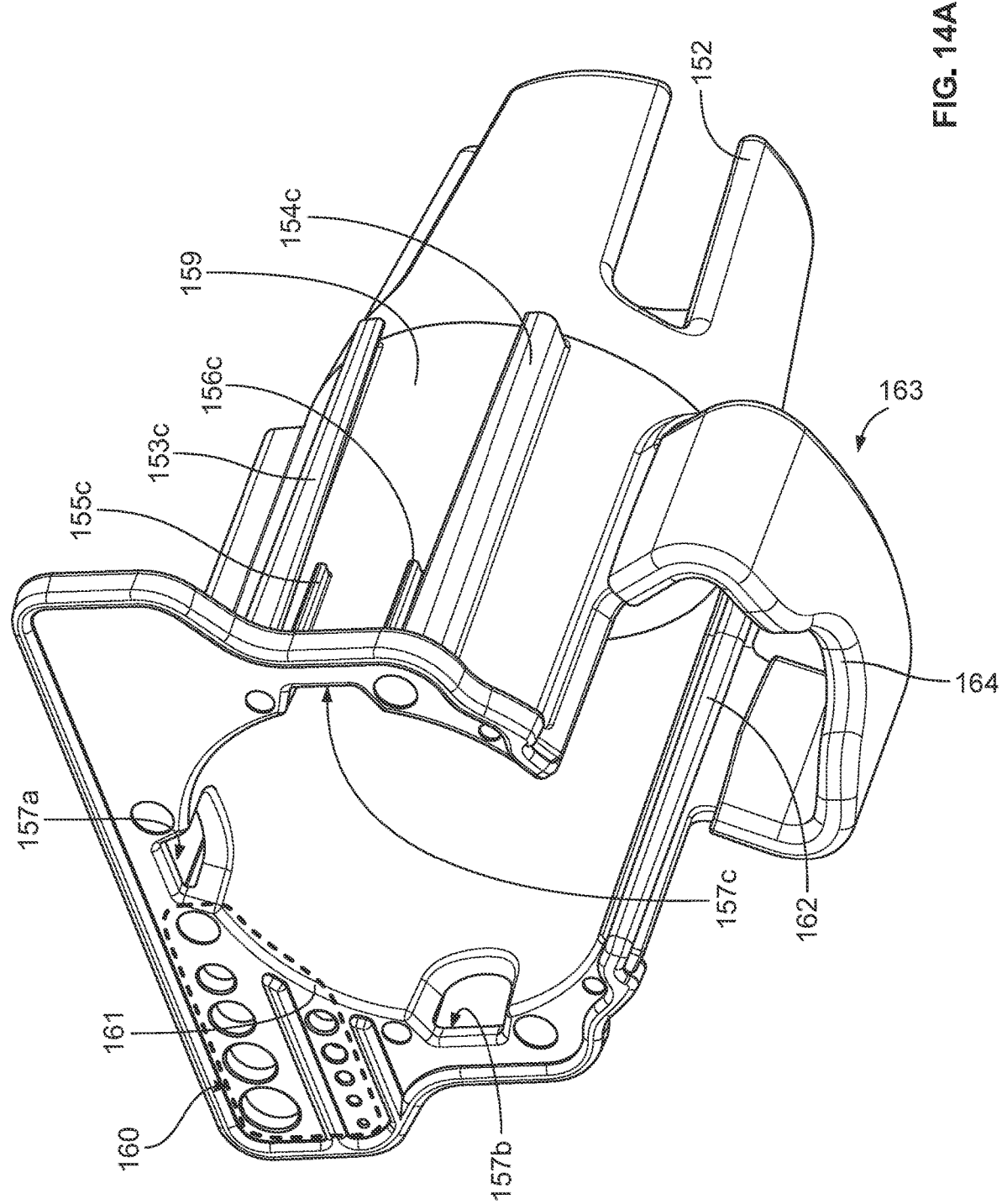

TOOL HOLDER

CROSS REFERENCE TO RELATED APPLICATIONS

This application is a continuation of U.S. application Ser. No. 17/571,258, filed on Jan. 7, 2022, which claims the benefit of U.S. application Ser. No. 29/811,911, filed on Oct. 18, 2021, and U.S. Appl. 63/257,490, filed on Oct. 19, 2021, the entireties of which are incorporated by reference, herein.

BACKGROUND

Generally, this application relates to a device for holding tools, such as hand-held tools.

BRIEF DESCRIPTION OF SEVERAL VIEWS OF THE DRAWINGS

FIG. 14A is a perspective view of tool holder with a triggering-prevention portion.

Figure 1A:
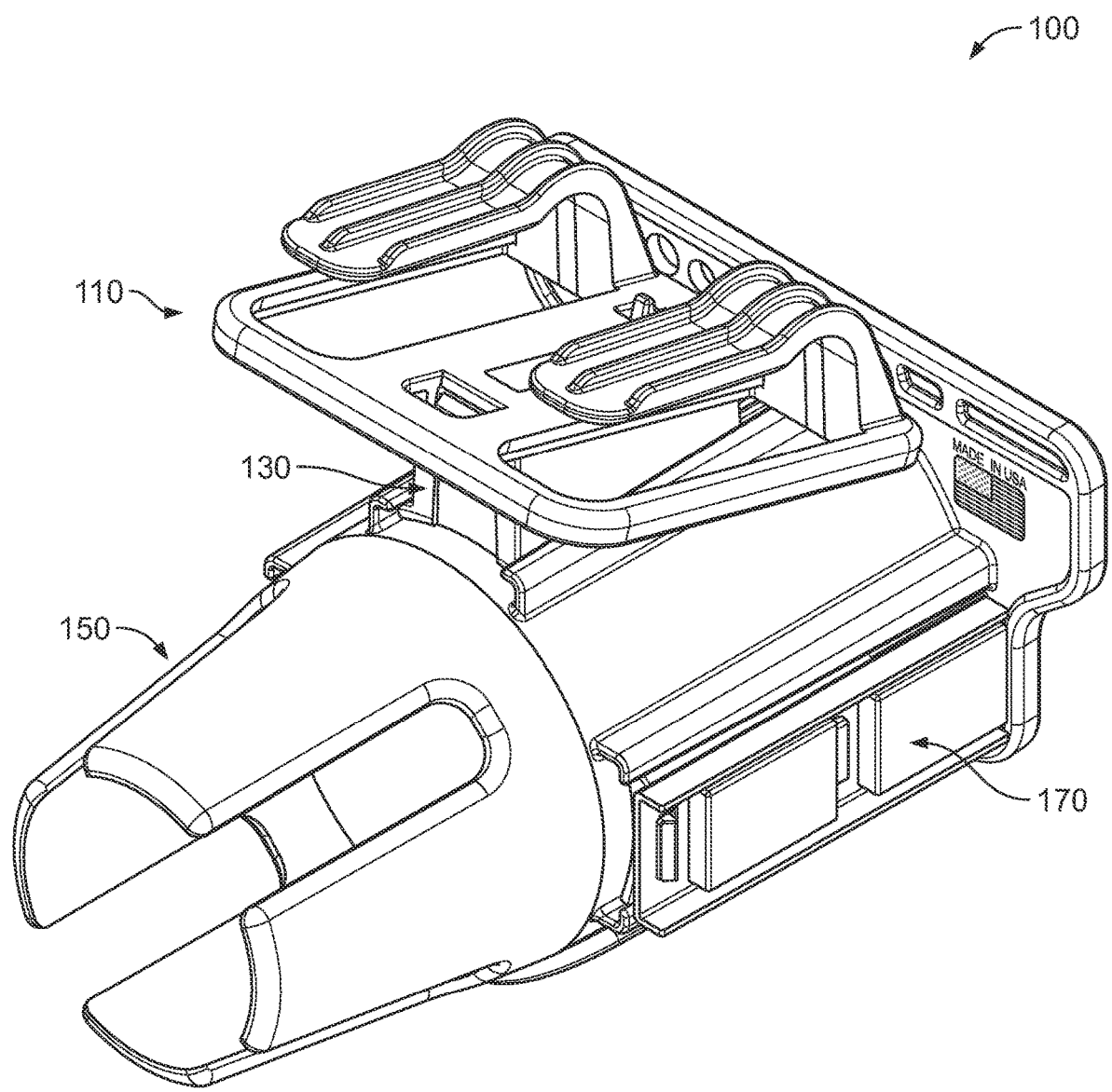
FIG. 1A is a perspective view of a first configuration of a tool holder.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

SUMMARY

According to embodiments, a tool holder for holding a tool includes a body and a mount. The body includes an interior region configured to receive the tool, wherein the tool defines a primary axis. The mount includes an angled portion, wherein the mount is coupled to the body, wherein the mount is configured to be secured to an object, and wherein the object defines a primary axis. The mount maintains the body in an orientation such that when the body receives the tool and mount is secured to the object, the primary axis of the tool and the primary axis of the object form an oblique angle. The mount may include at least one clip configured to removably engage the object to secure the mount to the object. Or the mount may not include a clip. If the clip is included, the at least one clip and the angled portion may be non-destructively separable. The mount may be removably coupled to the body and is further configured to be removably coupled in a plurality of positions with respect to the body. The mount may include at least one through-hole configured to receive a fastener to secure the mount to the object. The tool holder may include a triggering-prevention portion coupled to the body, wherein the triggering-prevention portion is configured to prevent a trigger of a tool from being engaged when the tool is held by the tool holder. The triggering-prevention portion may be removably coupled to the body.

According to embodiments, a tool holder includes a body and a mount. The body includes an interior region configured to receive the tool. The mount is configured to be secured to an object. The mount is further configured to be removably coupled to the body and be selectively positioned in a plurality of positions with respect to the body. The mount may include an angled portion, wherein the object defines a primary axis, and wherein the mount maintains the body in an orientation such that when the body receives the tool and mount is secured to the object, the primary axis of the tool and the primary axis of the object form an oblique angle. The body may include a top face, a right-side face, and a left-side face, wherein the mount is configured to be removably coupled to each of the top face, the right-side face, and the left-side face of the body. The body may include a plurality of sets of receiving features, wherein each set of receiving features is configured to couple the body to the mount, wherein the mount includes two runners, and wherein the receiving features include two rails that respectively receive the two runners. Each set of receiving features may include a stopping portion to stop the travel of the mount when it is received by the set of receiving features. Each set of receiving features may include an aperture, wherein the mount includes a spring arm and a spring arm head, and wherein the aperture is configured to receive the spring arm head, such that the mount securely couples to the body. The aperture may be configured to receive a portion of a human finger such that a user can force the spring arm head out of the aperture to allow the mount to be removed from the body. The tool holder may further include a triggering-prevention portion coupled to the body, wherein the trigger prevention portion is configured to prevent a trigger of a tool from being engaged when the tool is held by the tool holder. The trigger prevention portion may be removably coupled to the body. The tool holder may further include an accessory configured to be removably coupled to the body and be selectively positioned in the plurality of positions with respect to the body. The accessory may include a magnet assembly. The body may include a bit-size guide including a plurality of apertures corresponding to different sized drill bits, wherein the bit-size guide is configured to indicate to a user the size of a given drill bit

DETAILED DESCRIPTION

Figure 1B:
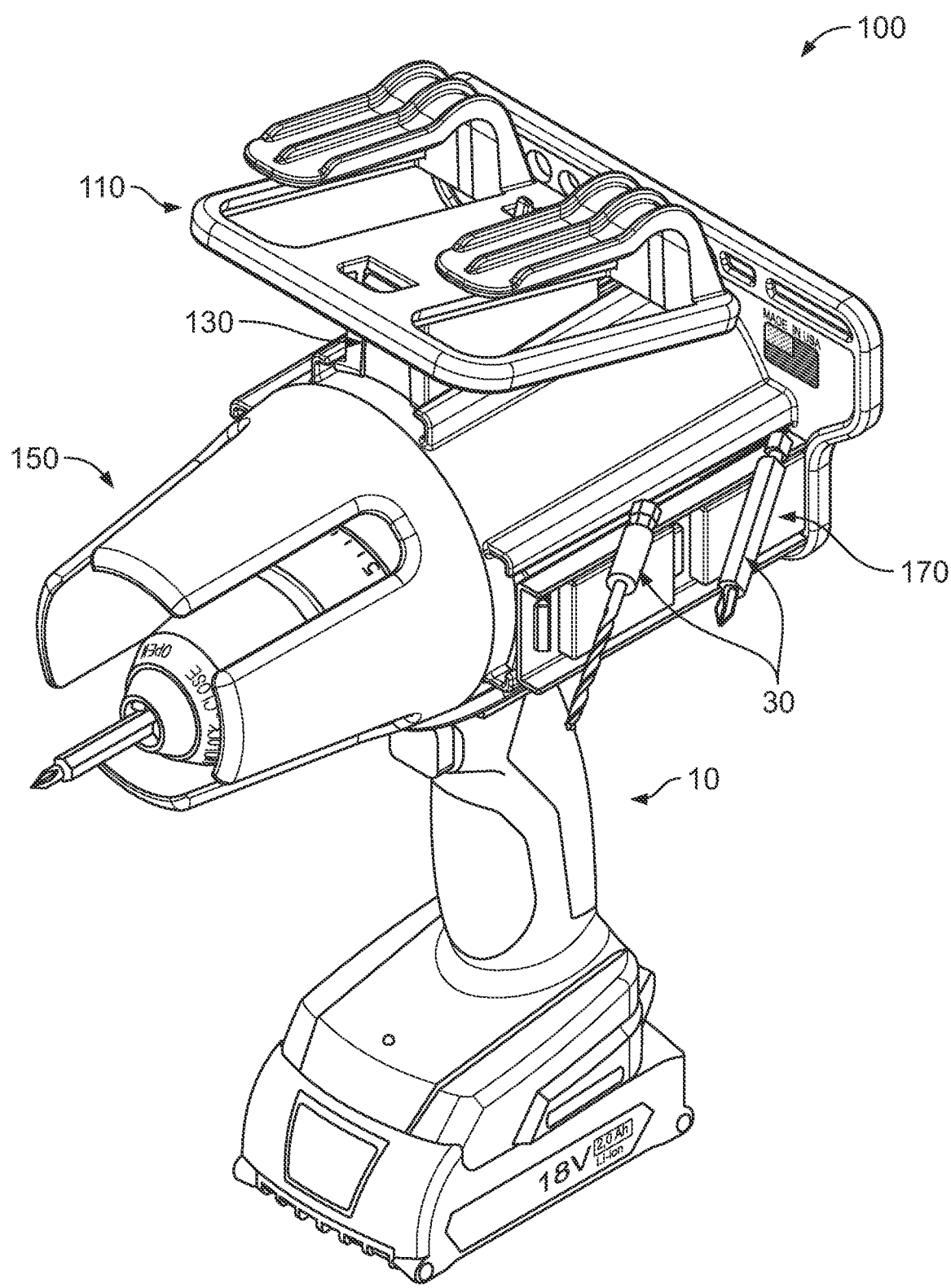
FIG. 1B is a perspective view of the first configuration of tool holder holding a drill.
Figure 1C:
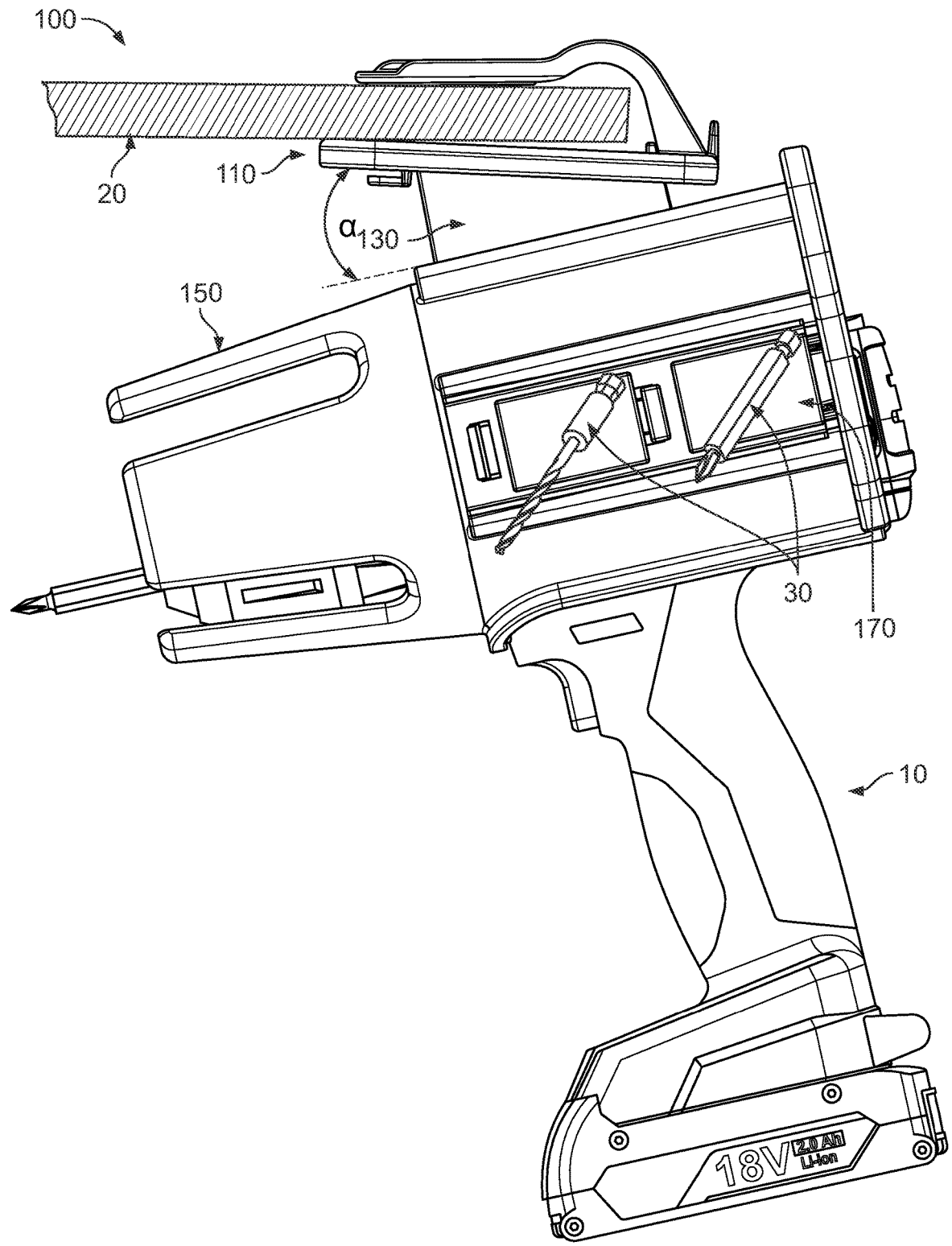
FIG. 1C is an elevation view of a first configuration of tool holder holding a drill and attached to a portion of a portion of an object.
Figure 2A:
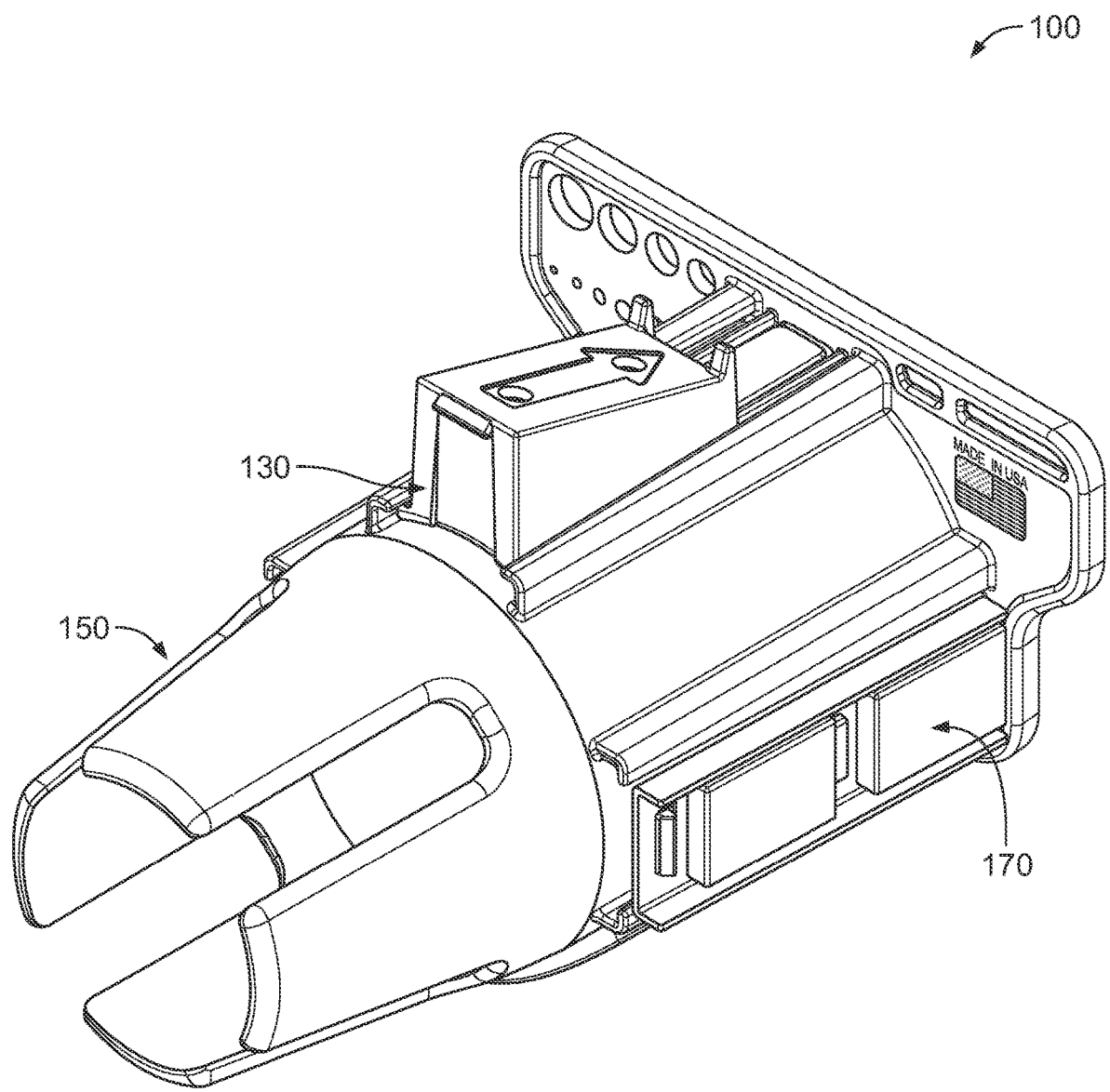
FIG. 2A is a perspective view of a second configuration of a tool holder.
Figure 2B:
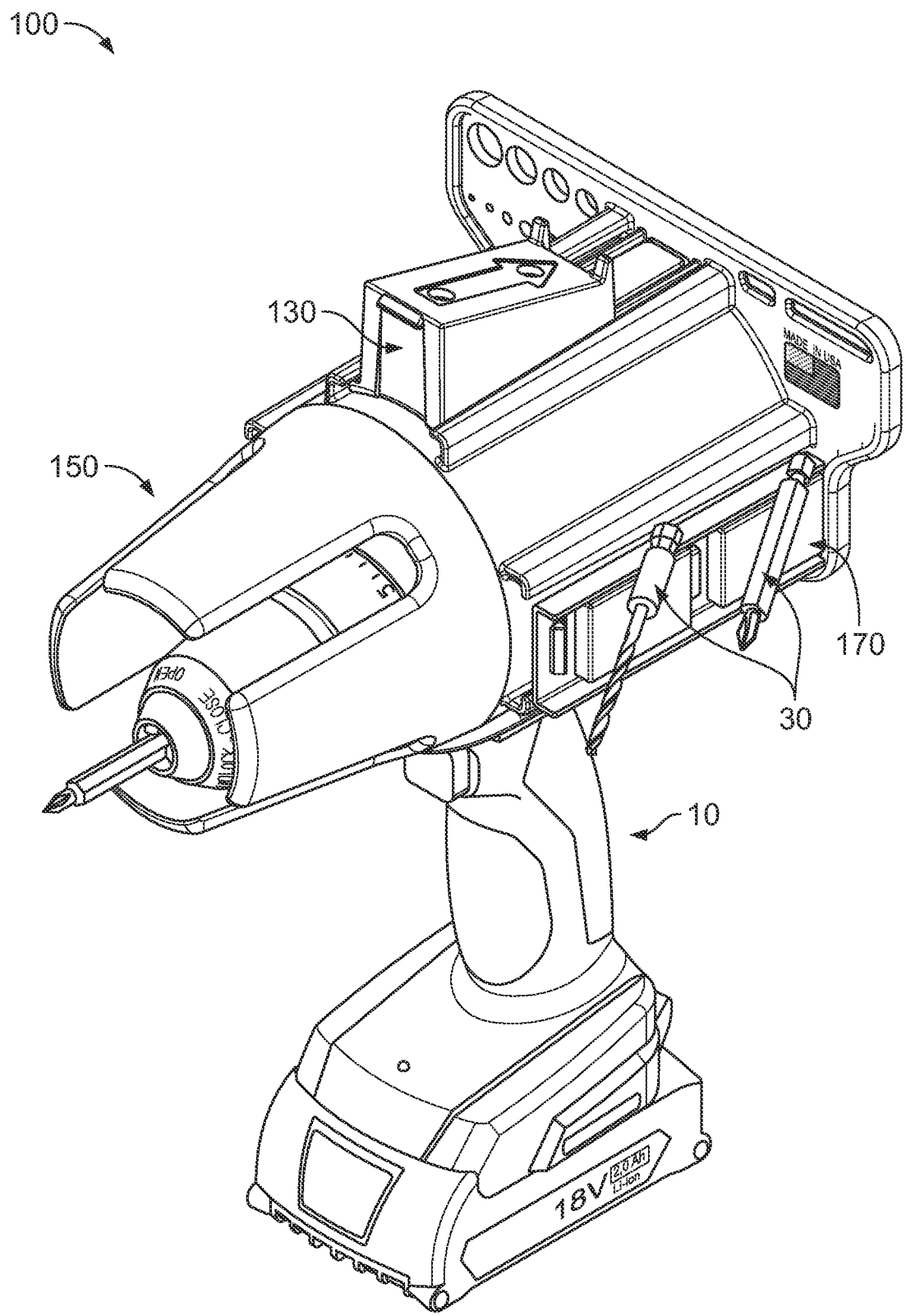
FIG. 2B is a perspective view of the second configuration of tool holder holding a drill.
Figure 2C:
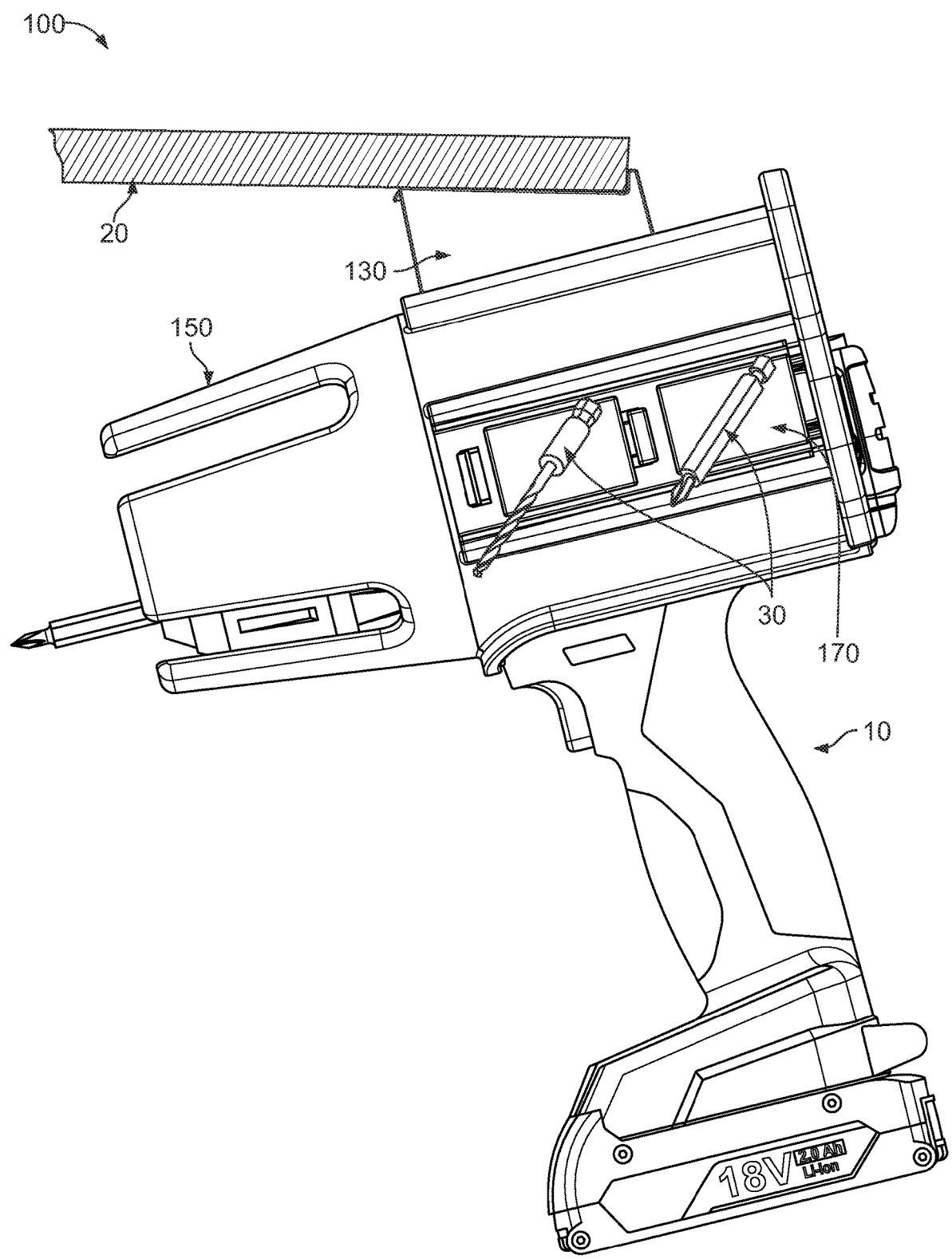
FIG. 2C is an elevation view of a second configuration of tool holder holding a drill and attached to a portion of an object.
Figure 3A:
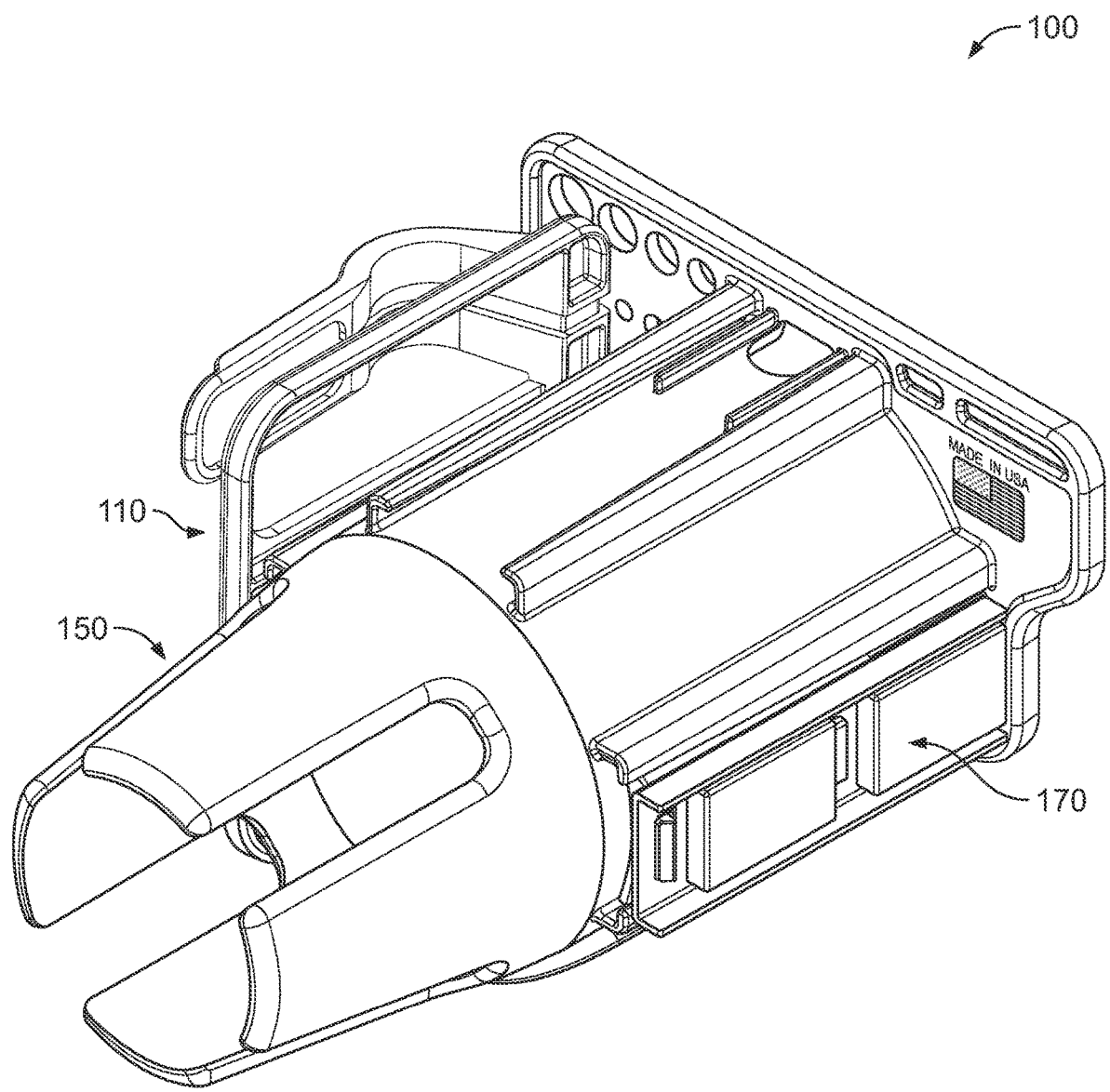
FIG. 3A is a perspective view of a third configuration of a tool holder.
Figure 3B:
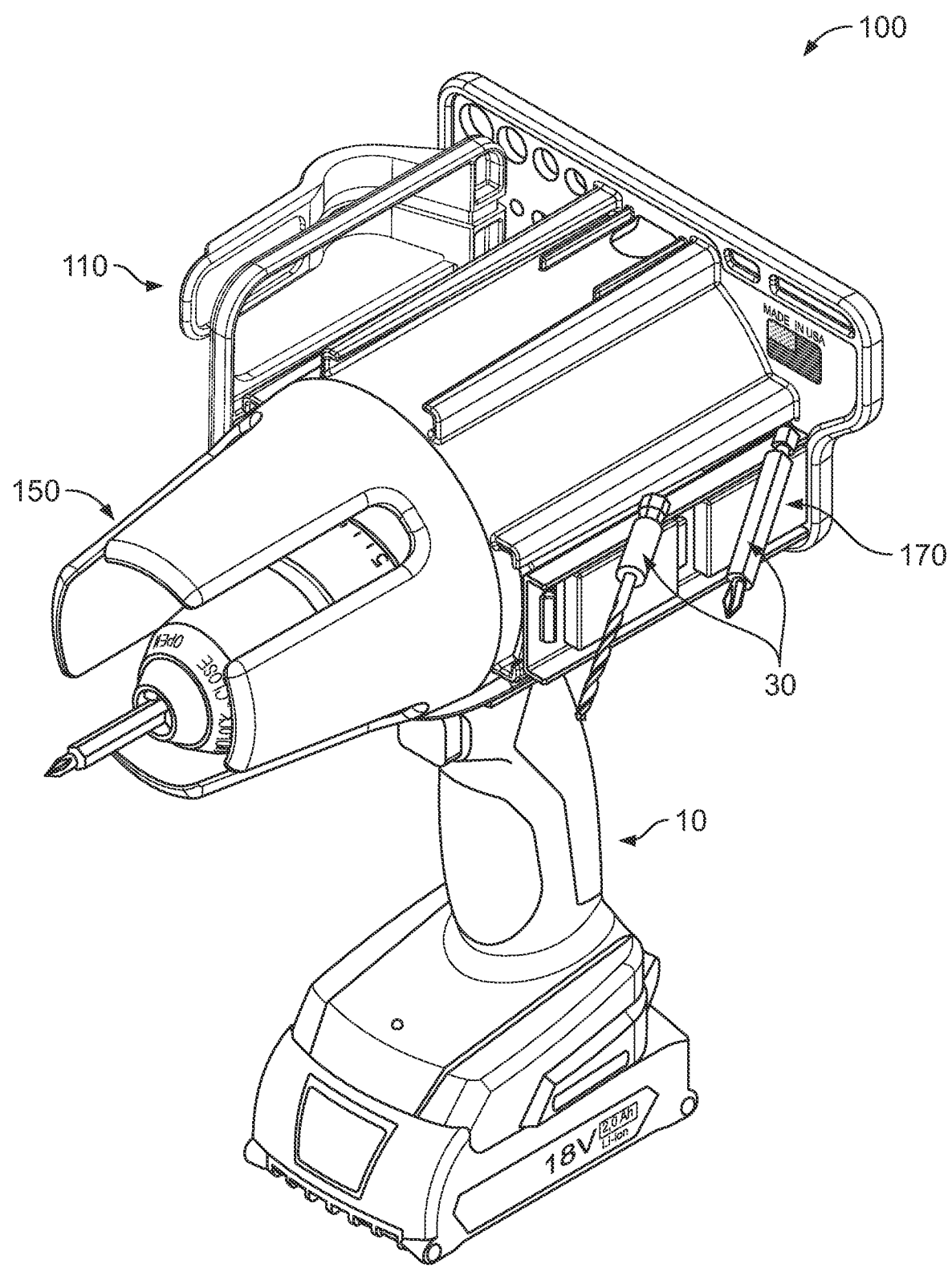
FIG. 3B is a perspective view of the third configuration of tool holder holding a drill.
Figure 3C:
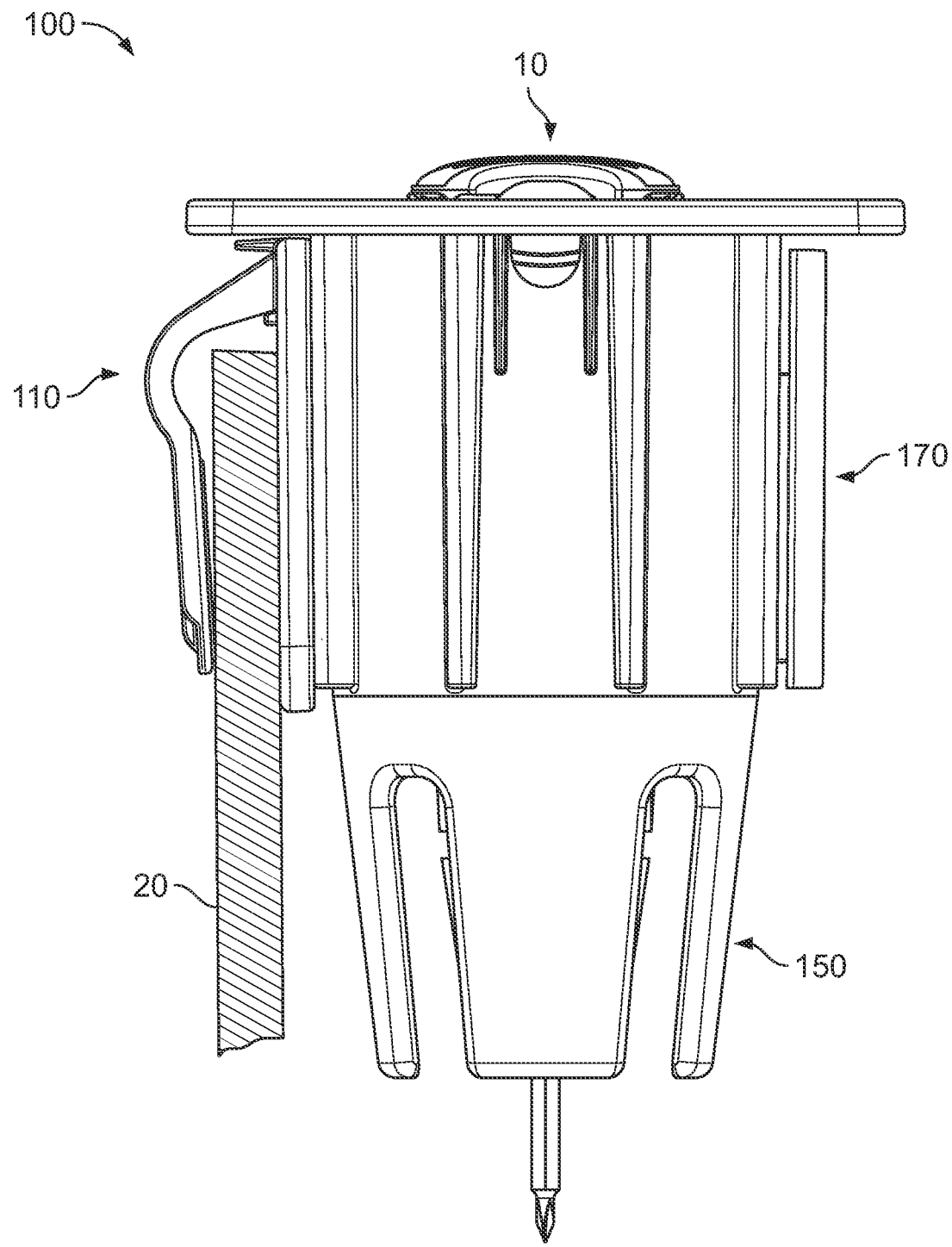
FIG. 3C is an elevation view of a third configuration of tool holder holding a drill and attached to a portion of an object.

FIGS. 1A, 2A, and 3A are perspective views of three configurations (first, second, and third) of a tool holder 100. As will be further described, there may be more configurations of tool holder 100. FIGS. 1B, 2B, and 3B are perspective views of the three configurations (first, second, and third, respectively) of tool holder 100 holding a cordless drill 10. Instead of drill 10, any device or item (tool) that could be retained in tool holder 100 is contemplated. Other examples of a tool include power tools (handheld, cordless, corded, etc.) or conventional tools (hammers, wrenches, painting implements, etc.). The shape of tool holder 100 may be adapted to more particularly accommodate different types of tools 10, as is apparent. FIGS. 1C, 2C, and 3C are perspective views of the three configurations (first, second, and third, respectively) of tool holder 100 mounted to a portion of an object 20 and holding drill 10, according to certain embodiments. In FIGS. 1C and 2C, object 20 is horizontally arranged, like a shelf. In FIG. 3C, object 20 is vertically arranged, like a sidewall. Other types of objects 20 may be located on a user's person, such as a belt or harness. FIGS. 1C, 2C, and 3C are non-limiting examples. Each configuration of tool holder 100 can be mounted to a vertically-arranged, horizontally-arranged, obliquely-arranged, cylindrical, square, or other shaped or arranged object 20. Also depicted in these figures are different bits 30 that are retained by magnet assembly 170.

FIGS. 1C and 2C further show an angle α. As will be understood, Drill 10 defines a primary axis, being the center axis of the chuck and bit of the handheld cordless drill. In the example of drill 10 as shown, the primary axis aligns with the primary axis defined by an interior region of body 150. Object 20 defines a plane. As shown in FIGS. 1C and 2C, the primary axis of drill 10 (or body 150) and plane of object 20 form an oblique angle alpha α. This angle α may provide an advantage of keeping drill 10 more stably retained in tool holder 100, especially when tool holder 100 is secured to a horizontally-arranged object 20. Because of the oblique angle α, drill 10 may be less likely to fall out of tool holder 100 due to inadvertent contact or vibrations. As shown, a is 15 degrees. Generally, a could be in the range of 5 to 45 degrees, although this range is not limiting. For example, a could be as large as 90 degrees. Embodiments herein show a as being only one value, but it may be possible for a to vary across at least some of this range.

Figure 4:
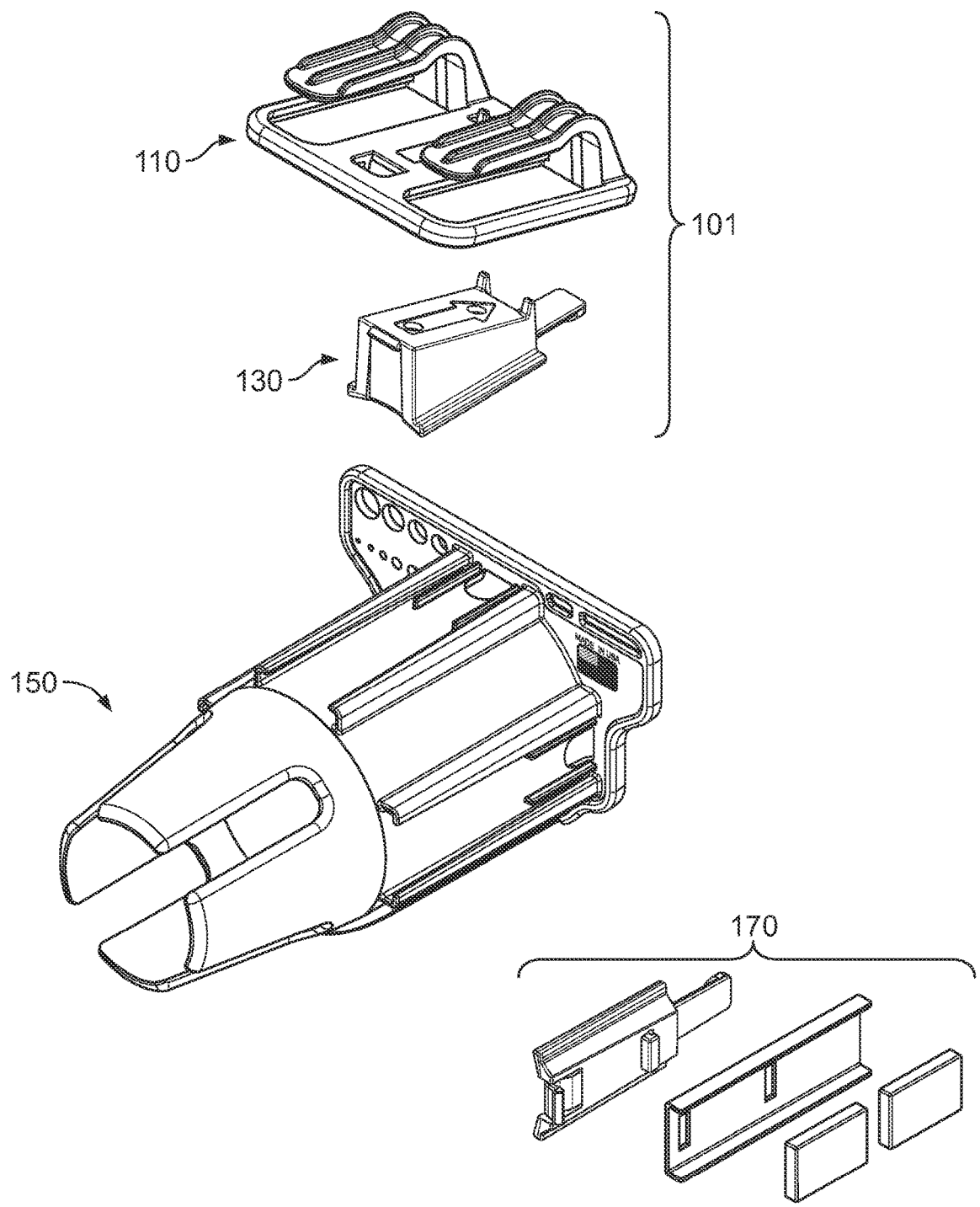
FIG. 4 is an exploded view of the first configuration of tool holder.

FIG. 4 is an exploded view of the first configuration of tool holder 100. Each configuration of tool holder 100 described and depicted herein may be formed from two or more components shown in FIG. 4. Tool holder 100 is understood to describe one or more of these or other configurations. Tool holder 100 may include mount 101, body 150, and magnet assembly 170. Mount 101 may further include clip 110 and/or angled portion 130. In FIGS. 1A, 1B, and 1C, mount 101 includes clip 110 and angled portion 130. In FIGS. 2A, 2B, and 2C, mount 101 includes angled portion 130, but not clip 110. In FIGS. 3A, 3B, and 3C, mount 101 includes clip 110, but not angled portion 130. In this third configuration of tool holder 100, clip 110 is directly attached body 150. As depicted and further described, clip 110 does not include features shown in angled portion 130 or magnet assembly 170 that allow clip 110 to couple directly with body 150. Still, clip 110 may include all or some of such features or other features that allow direct coupling with body 150.

Two or more components of tool holder 100 may optionally be integrated or formed as one piece, such that separating them would require additional effort or potentially destroy one or both of the individual components. For example, if mount 101 includes clip 110 and angled portion 130, these components may be formed as one piece or otherwise integrated. If they are integrated using an epoxy or fastener(s), additional effort may be required to separate them. On the other hand, in certain embodiments of clip 110 and angled portion 130, the components may be selectively and non-destructively disengageable (e.g., through a clip, button, lever, or the like integrated in one or both of the components), such that they are not integrated. In other embodiments, a given component of tool holder 100, such as body 150, may be separable into two or more pieces. As will further be explained, mount 101 may be removably coupled to body 150, in which case, mount 101 and body 150 are not integrated. Mount 101 may be removably coupled to body 150 such that it can be selectively positioned in different ones of a plurality of positions with respect to body 150.

One or more components of tool holder 100 may be formed with a material such as glass-filled nylon and/or propylene. Such a material may have a relatively high resistance to impacts and may feel more "solid" and less tinny. The components may further include a second material, such as an overmold. Examples of a second material include thermoplastic urethane (TPU) or thermoplastic rubber (TPR). The component(s) of tool holder 100 may be formed by injection molding, including optionally one or more overmolding steps.

Figure 5A:
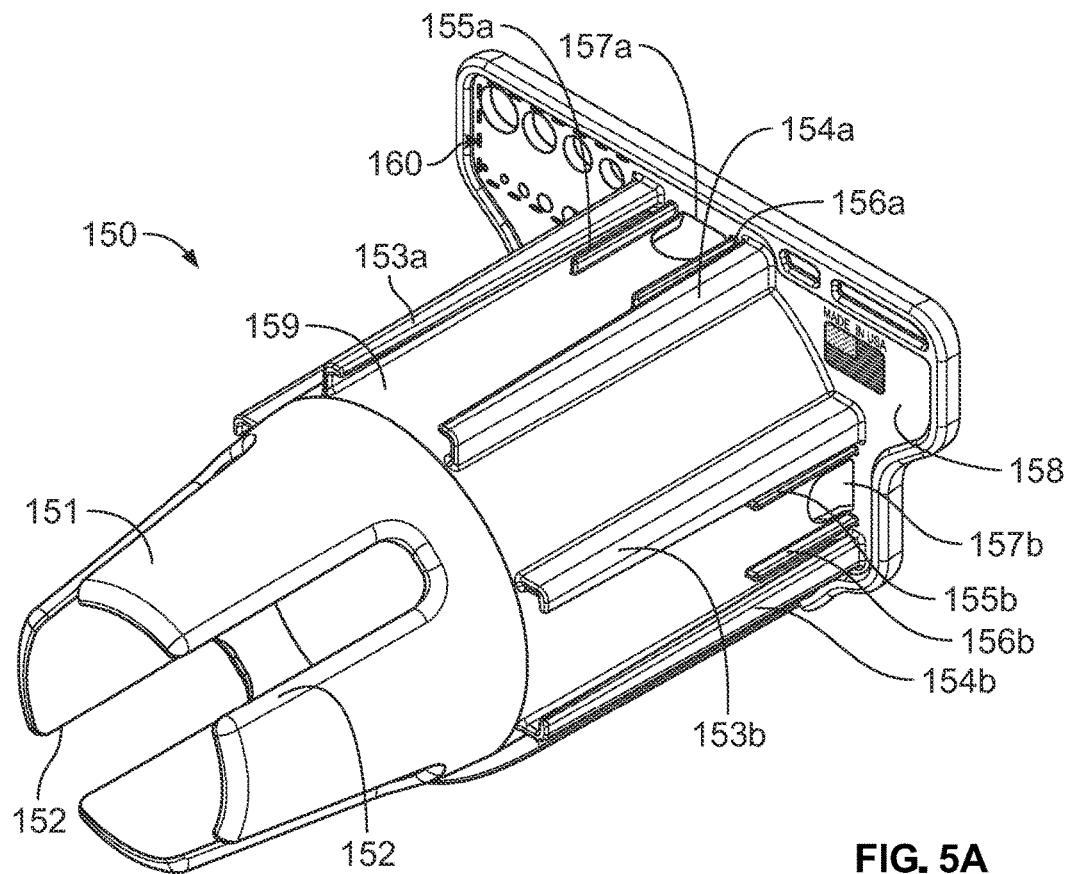
FIGS. 5A and 5B are top and bottom perspective views of a body of tool holder.
Figure 5B:
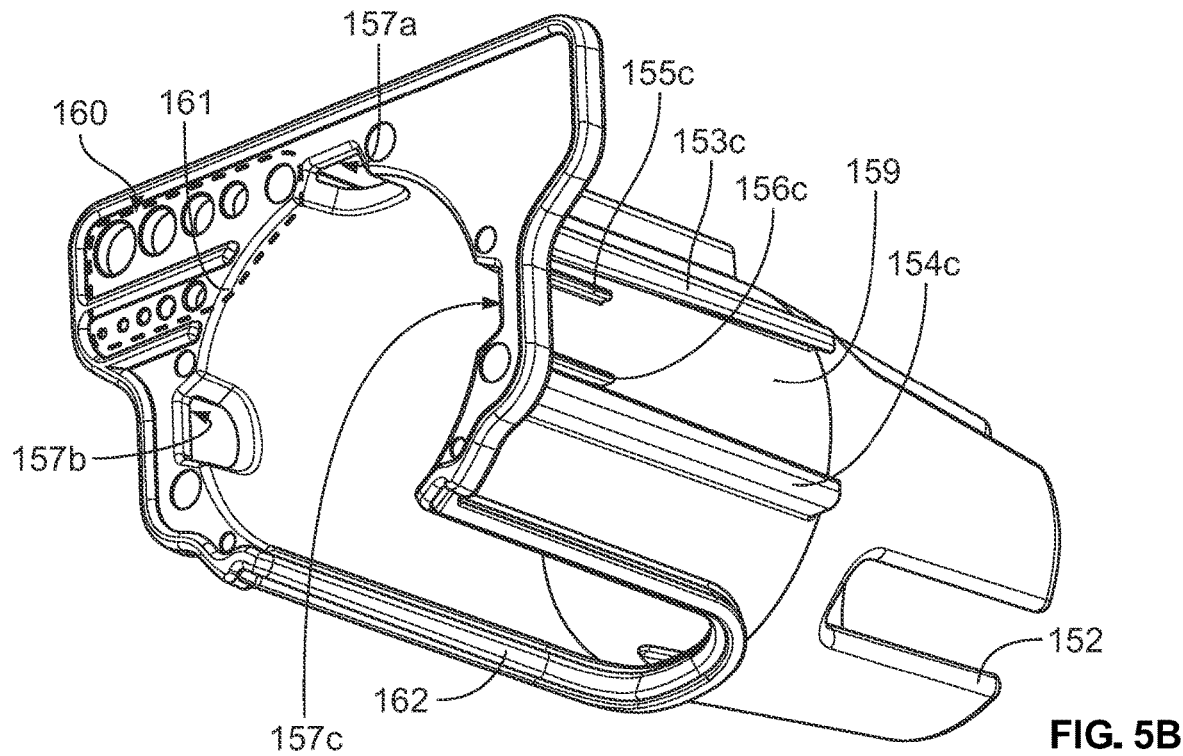

FIGS. 5A and 5B are perspective views of body 150, which receives drill 10. Body 150 includes a tubular portion 159 (shown as cylindrical) and a tapered or frustoconical portion 151, together forming an interior region. Frustoconical portion 151 has a plurality of contours 152 (three as shown), which form empty areas in frustoconical portion 151. Tubular portion 159 may include contours 161 and 162. Together, contours 161 and 162 form an opening into the interior region of body 150. Contour 161 defines a portion of the opening that receives the body of drill 10. Contour 162 defines a portion of the opening that receives the handle of drill 10. An overmolded portion may be located around some or all of contour 162. This portion may provide cushion or protection from undue impacts or scratching between body 150 and drill 10 (e.g., handle of drill 10).

Body 150 further includes a plate 158 extending outwardly (e.g., radially) from tubular portion 159. Plate 158 (or another part of tool holder 100) further defines a set of circular apertures that can serve as a gauge 160 to determine a size of a drill bit or other hardware, such as a screw, bolt or nail. Each aperture can be labeled with a size (⅛, 5/16, etc.) that indicates to the user the diameter of a bit shaft. Plate 158 has areas on the front or rear that can have letters or images, such as a product trademark (e.g., DRILL DOCK™) or logo, instructions, or designation of origin like "Made in the USA" along with a flag (e.g., "Stars and Stripes" or "Old Glory"). Such information may be integral with plate 150 (recessed, embossed, or printed), on a label, or on an overmolded portion (e.g., a second material having a different composition and/or color from the substrate material of plate 158 that is molded or otherwise attached to the substrate material). The overmolded portion can cover other areas of body 150.

Body 150 further includes one or more sets of rails. As shown, body includes three sets of rails. The first set includes rails 153a and 154a. The second set includes rails 153b and 154b. The third set includes rails 153c and 154c. The sets of rails may be substantially identical but located at different parts of body 150. As shown, the first set of rails is on the upper side of body 150, the second set of rails is on the left side of body 150, and the third set of rails is on the right side of body 150. As used herein, rail 153 refers to any one of rails 153a, 153b, or 153c. Rail 154 refers to any corresponding one of rails 154a, 154b, or 154c. Rails 153 and 154 receive clip 110, angled portion 130, or magnet assembly 170. The three sets of rails 153, 154 allow clip 110, angled portion 130, or magnet assembly 170 to be positioned at different locations with respect to body 150.

Each set of rails 153, 154 is associated with a respective aperture 157 (157a, 157b, and 157c) in body 150. Each set of rails 153, 154 is further associated with a first stop 155 (155a, 155b, and 155c) and a second stop 156 (156a, 156b, and 156c). Aperture 157 and/or stops 155, 156 facilitate the ability to couple mount 101 or magnet assembly 170 with body 150.

The region around the underside of aperture 157 (i.e., the side of aperture 157 within the hollow interior region of body 150 forms an arch, which is sized to receive a human finger (e.g., a thumb). The arch includes a tapered region such that the size of the aperture decreases between the underside of aperture 157 and the outer side of aperture 157. The tapered region is curved to match the contour of a human fingertip. The arch is sized to match a typical human finger (e.g., thumb), such that a user can easily feel and find the aperture 157 to disengage the spring arm head 136 from body 150, as will be further described. The maximum width of the arch may match a typical width of a human finger (e.g., 16-20 mm).

Figure 6A:
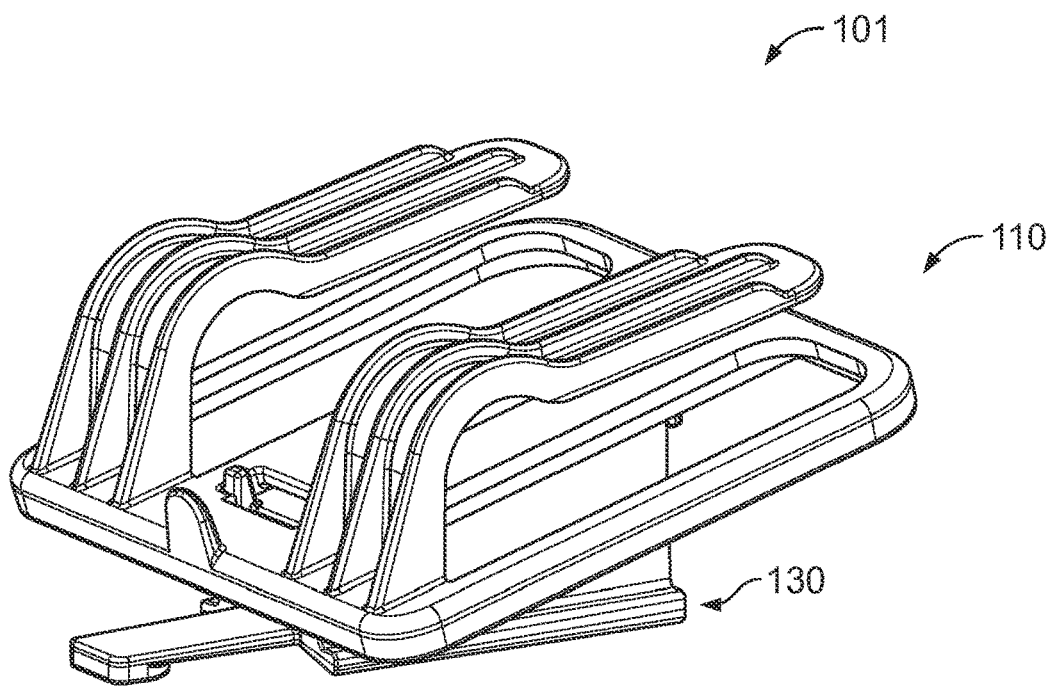
FIGS. 6A and 6B are top and bottom perspective views of a mount of tool holder.
Figure 6B:
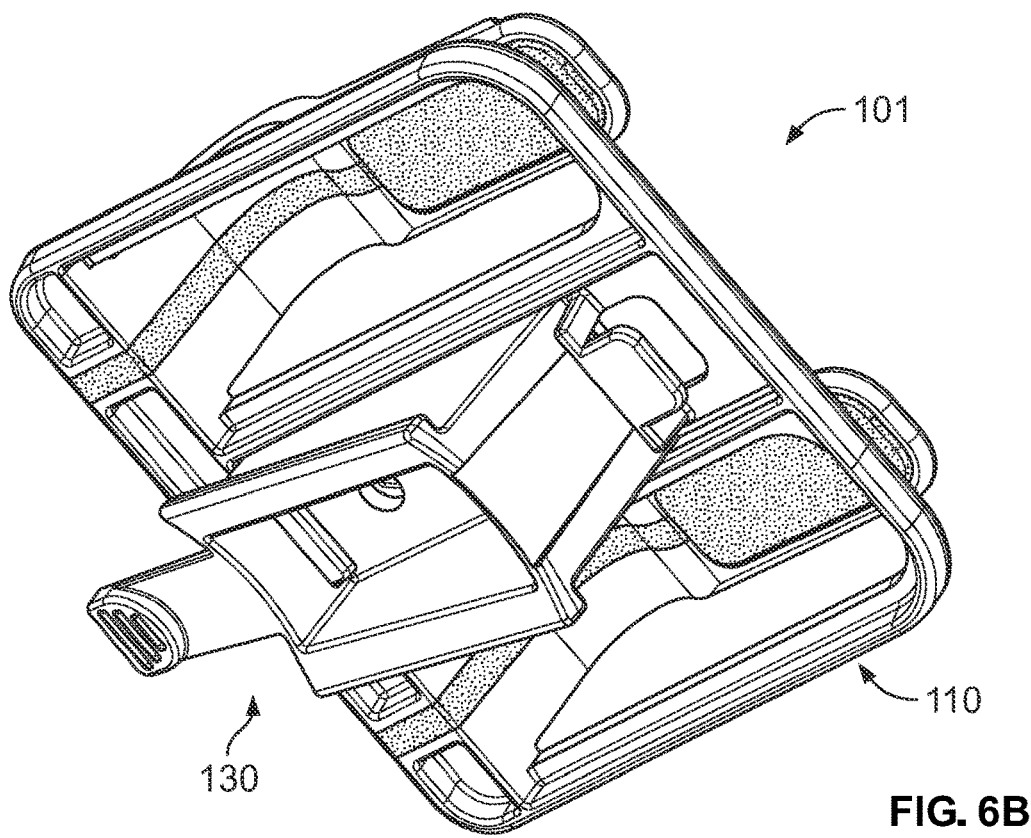

FIGS. 6A and 6B are top and bottom perspective views of mount 101 when it includes clip 110 and angled portion 130. As shown, clip 110 and angled portion 130 are separate pieces, which are coupled together. They may be removably coupled so they can be non-destructively separated. Or clip 110 and angled portion 130 may be permanently coupled such that separation would likely result in damage. In some instances, tool holder 100 includes an additional angled portion 130 and/or additional clip 110 so a user can have more than one type of mount 101 with a purchased tool holder 100.

Figure 7A:
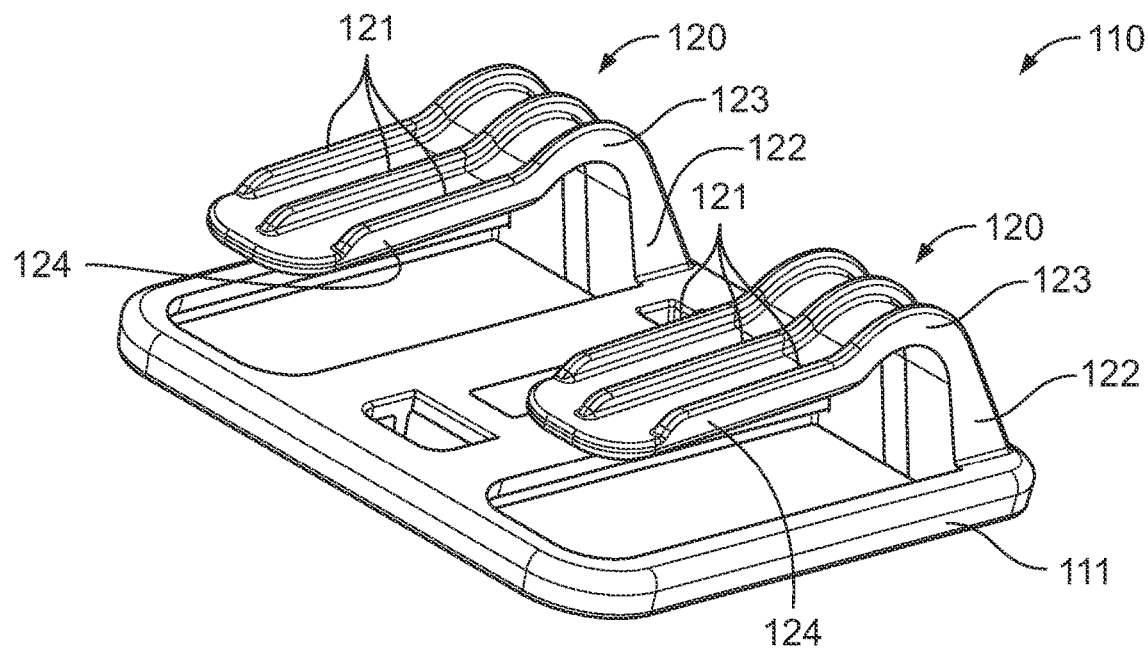
FIGS. 7A and 7B are top and bottom perspective views of a clip of tool holder.
Figure 7B:
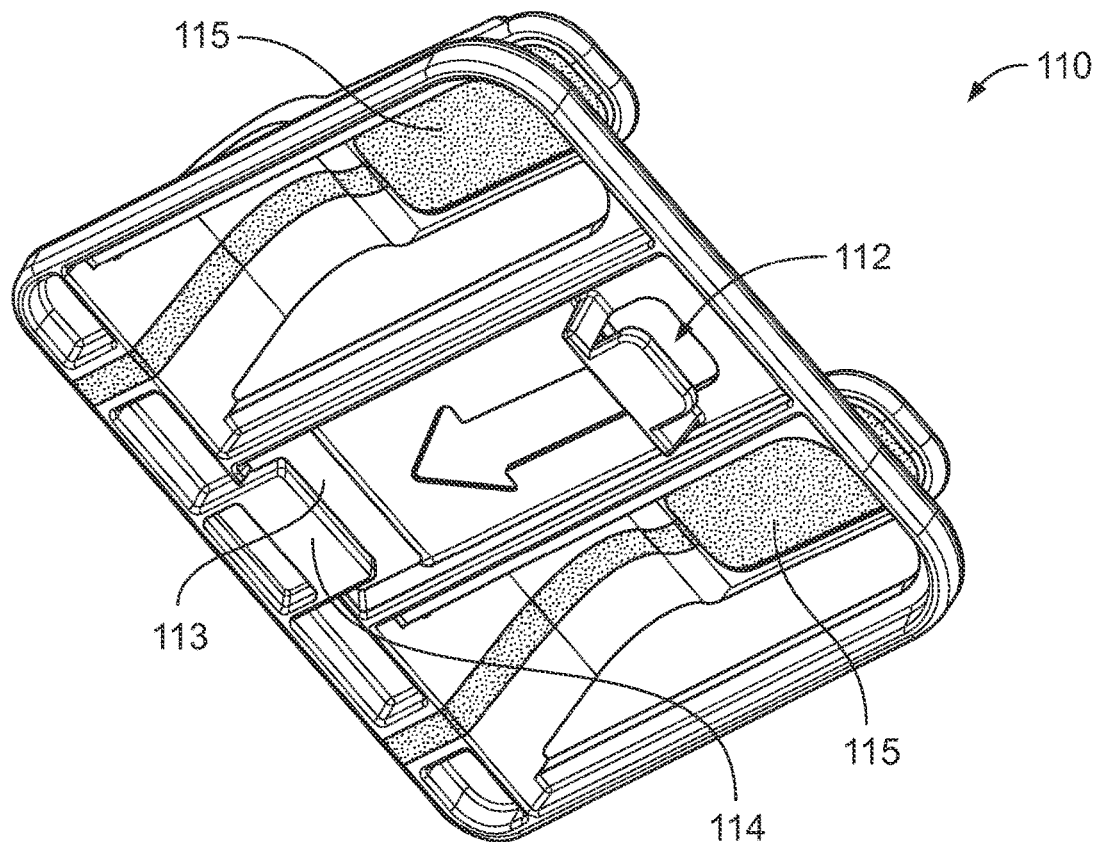

FIGS. 7A and 7B are top and bottom perspective views of clip 110, which is shown to include base 111 defining an aperture 112. Clip 110 further includes two gripping portions 115. Clip 110 also includes two spring arms 120, each having a plurality of ridges 121. Spring arm 120 has a spoon shape, including three sections—a support 122 coupled to base 111, an arced portion 123 extending from support 122, and an elongated portion 124 extending outwardly from arced portion 123 at an angle towards base 111. Gripping portion 115 (e.g., an overmolded material such as TPU or TPR) is positioned on the underside of spring arm 120.

As shown in FIGS. 1C and 3C, clip 110 clips to object 20. Before clipping, elongated portion 124 and base 111 define a minimum separation distance, which can be less than a thickness of object 20. When clip 110 is inserted on object 20, elongated portion 124 is forced away from base 111, thereby compressing spring arm 120. Then, base 111 and spring arm 125 exert forces against object 20 tending to keep clip 110 securely positioned on object 20. Furthermore, gripping portion 115 is forced against object 20, further tending to stabilize the position of clip 110 on object 20. When clip 110 is removed from object 20, spring arm 120 returns to its original position.

Support 122 is shown as having a width that tapers between base 111 and arced portion 123. This tapering may provide improved strength and durability of clip 110, such that spring arm 120 is less likely to inadvertently detach or break off from base 111. Arced portion 123 acts as a spring by compressing/decompressing as elongated portion 124 is moved towards/away base 111. The arc of arced portion 123 may be defined by a radius, such as 85 degrees.

Ridges 121 on the upper surface of spring arm 120 are shown to substantially transverse the length of spring arm 120. Each ridge 121 (three shown) provides a degree of rigidity and strength to spring arm 120 to increase the spring constant and prevent damage to clip 110 from potential overextension of spring arm 120. As shown, a ridge 121 is positioned along each lateral side of spring arm 120, and another ridge 121 is positioned in between the lateral ridges 121.

Aperture 112 accepts a feature on angled portion 130 to attach angled portion 130 with clip 110. Clip 110 also includes feature 114, which engages with a recess in angled portion 130 to attach clip 110 to angled portion 130.

Figure 8A:
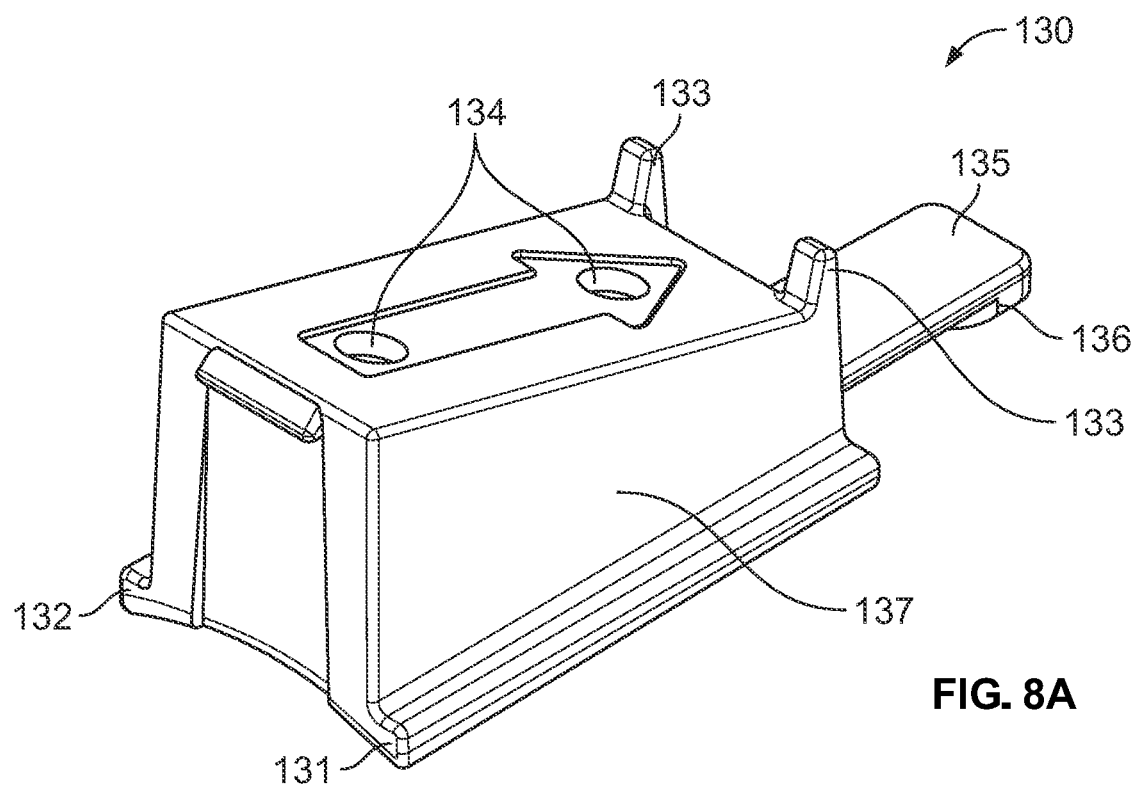
FIGS. 8A and 8B are top and bottom perspective views of an angled portion of tool holder.
Figure 8B:
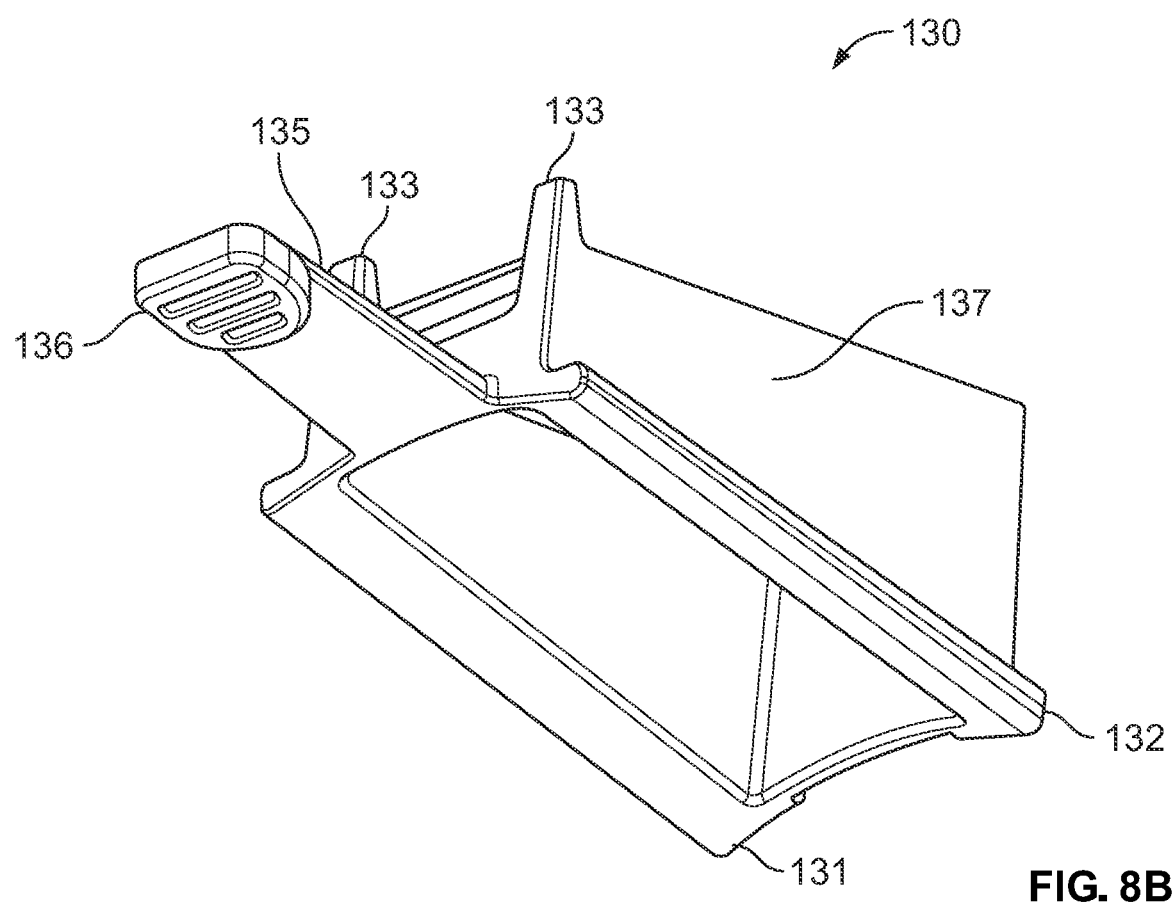
Figure 8C:
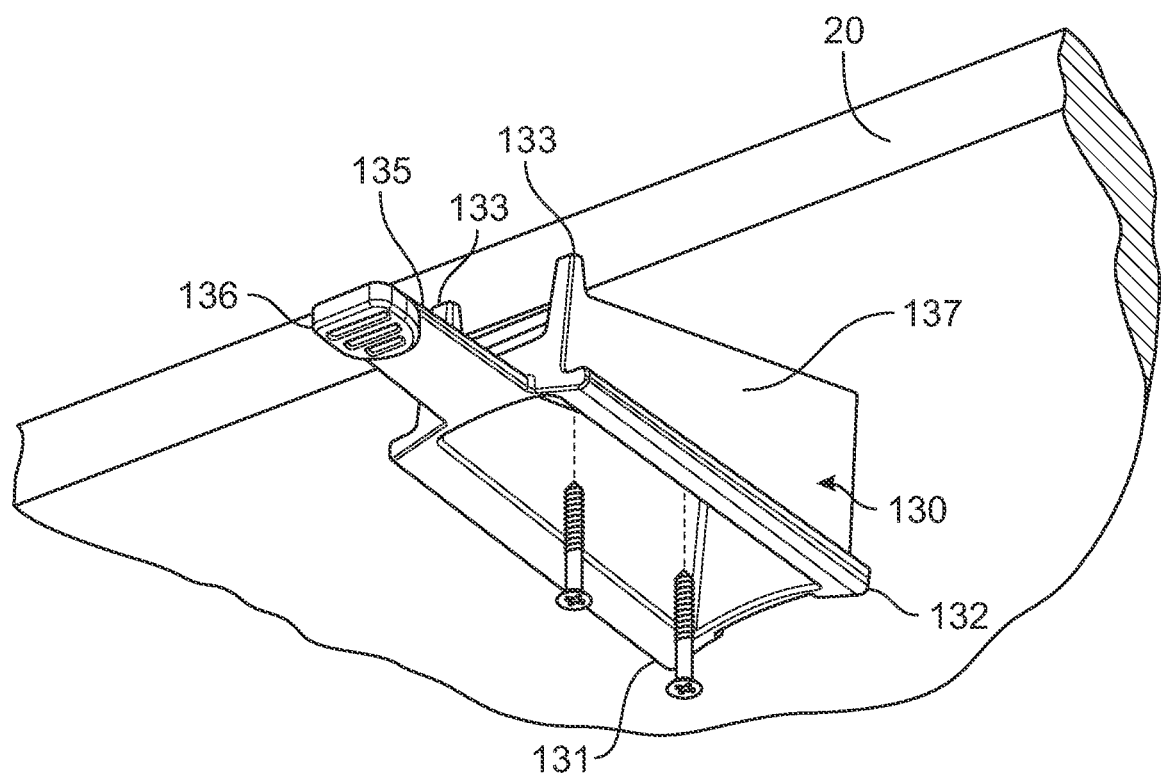
FIG. 8C is an elevation view of angled portion being mounted to a portion of an object.

FIGS. 8A and 8B are top and bottom perspective views of angled portion 130. FIG. 8C is an elevation view of angled portion 130 being mounted to object 20. Angled portion 130 includes angled body 137, first runner 131, second runner 132, guides 133, mounting holes 134, spring arm 135, and spring arm head 136. Angled body 137 defines a lower contour and upper contour that form an angle. This angle determines at least in part the angle at which drill 10 is oriented with respect to object 20. As shown in FIGS. 1C and 2C, angle α is 15 degrees, which corresponds to the angle defined by angled body 137. Generally, the angle defined by body could be between 5 and 45 degrees, although this range useful but non-limiting. As shown, this angle does not change, but angled portion 130 could be adjustable to provide for a range of angles. Furthermore, angled portion 130 could be mounted to body 150 and/or clip 110 in different ways to provide for different angles between drill 10 and object 20.

Runners 131, 132 extend outwardly from angled body 137. Runners 131, 132 engage with rails 154, 153, respectively. Specifically, rails 153, 154 form tracks through which runners 131, 132 securely travel. This allows angled portion 130 to slide into one of three different locations on body 150, using either first set of rails 153a, 154a, second set of rails 153b, 154b, or third set of rails 153c, 154c. When angled portion 130 slides into body 150 using the system of runners 131, 132 and rails 153, 154, the forward motion of angled portion 130 is limited. As angled portion 130 slides along, angled body 137 will encounter stops 155, 156, thereby preventing additional forward motion. Angled portion 130 further includes mounting guides 133 and mounting holes 134, As shown in FIG. 8C, mounting guides 133 allow for accurate positioning of angled portion 130 on object 20. Mounting holes 134 receive fasteners that attach angled portion 130 to object 20. Angled portion 130 further includes spring arm 135 and spring arm head 136. Spring arm 135 and spring arm head 136 interact with aperture 157, as depicted in FIGS. 13A-13D and will be described below.

Figure 9A:
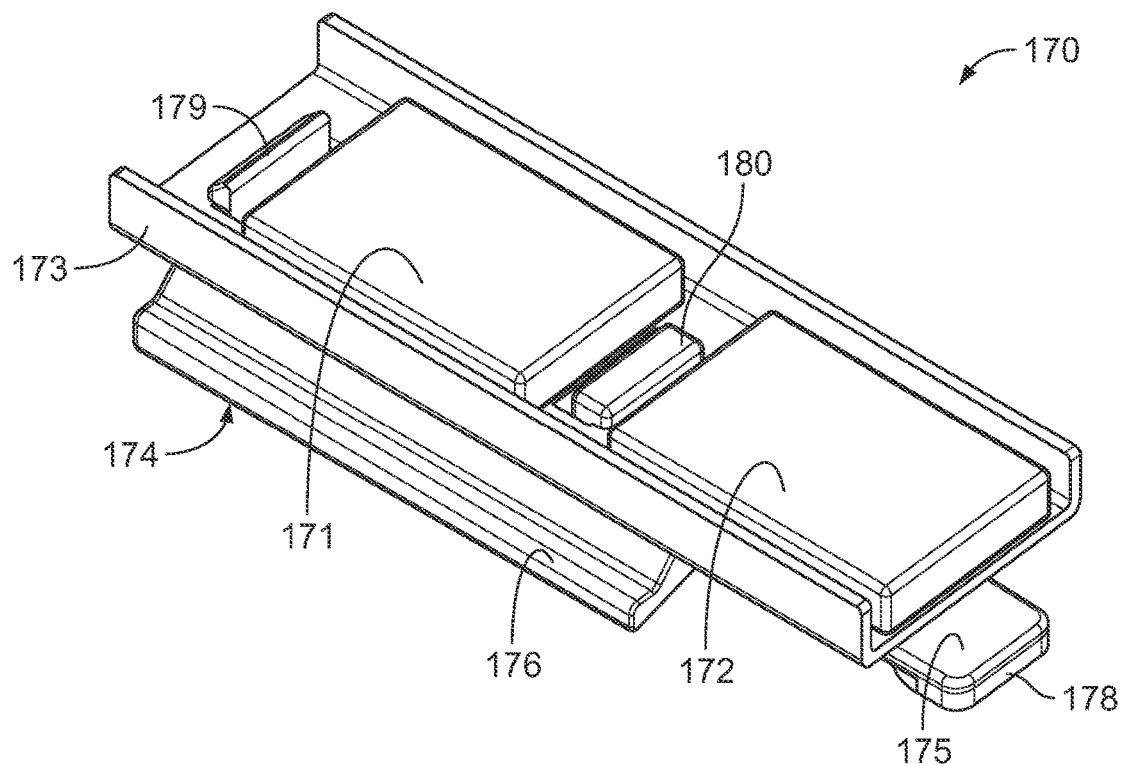
FIGS. 9A and 9B are top and bottom perspective views of a magnet assembly of tool holder.
Figure 9B:
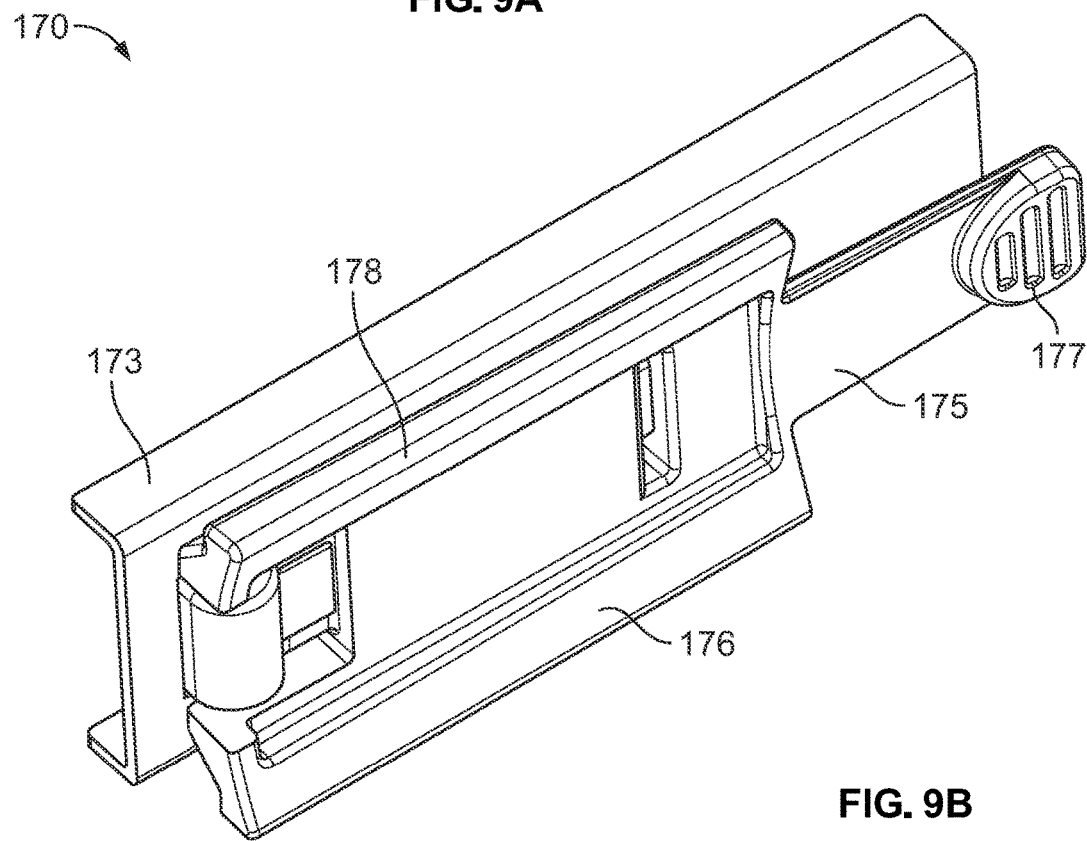
Figure 9C:
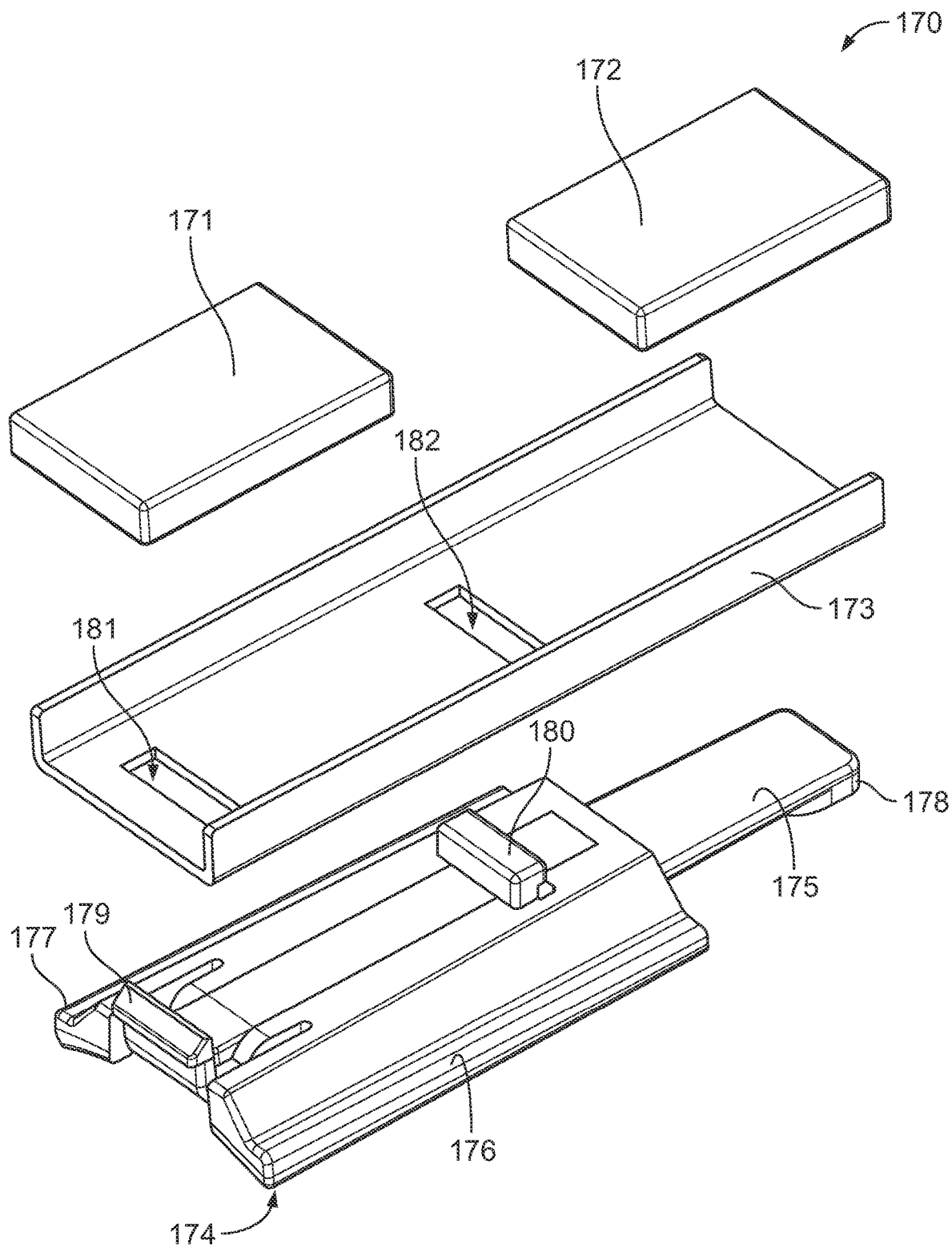
FIG. 9C is an exploded view of the magnet assembly.
Figure 10A:
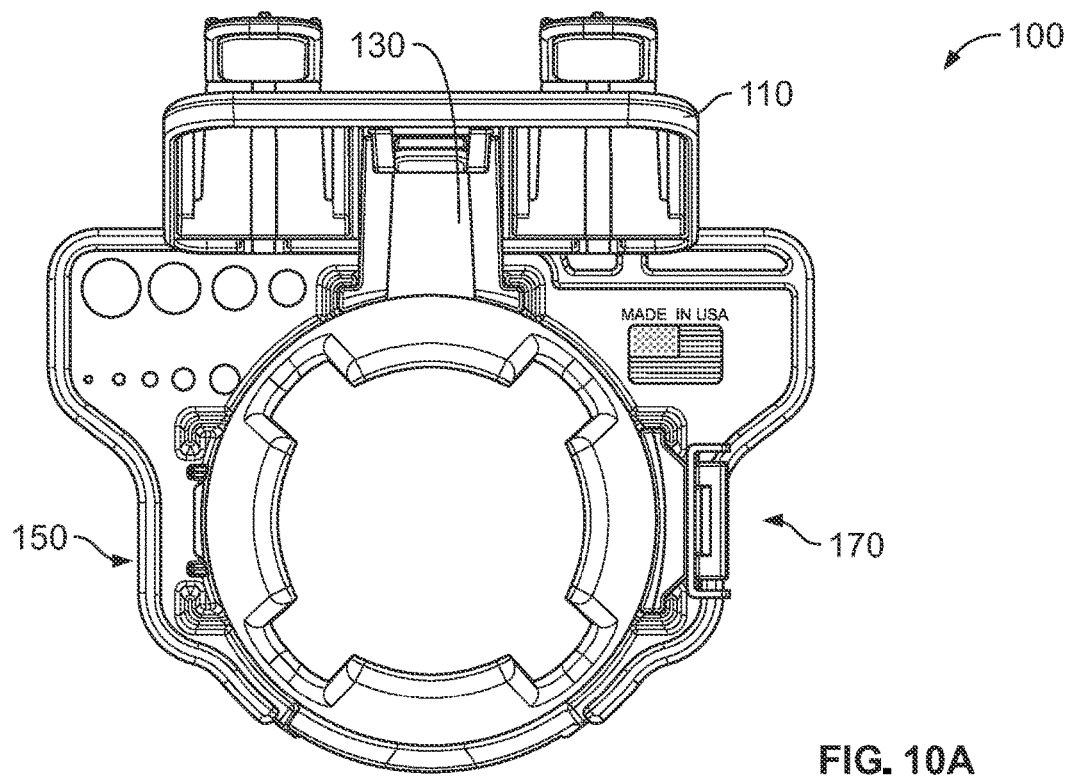
FIG. 10A is a front-side elevation view the first configuration of tool holder.
Figure 10B:
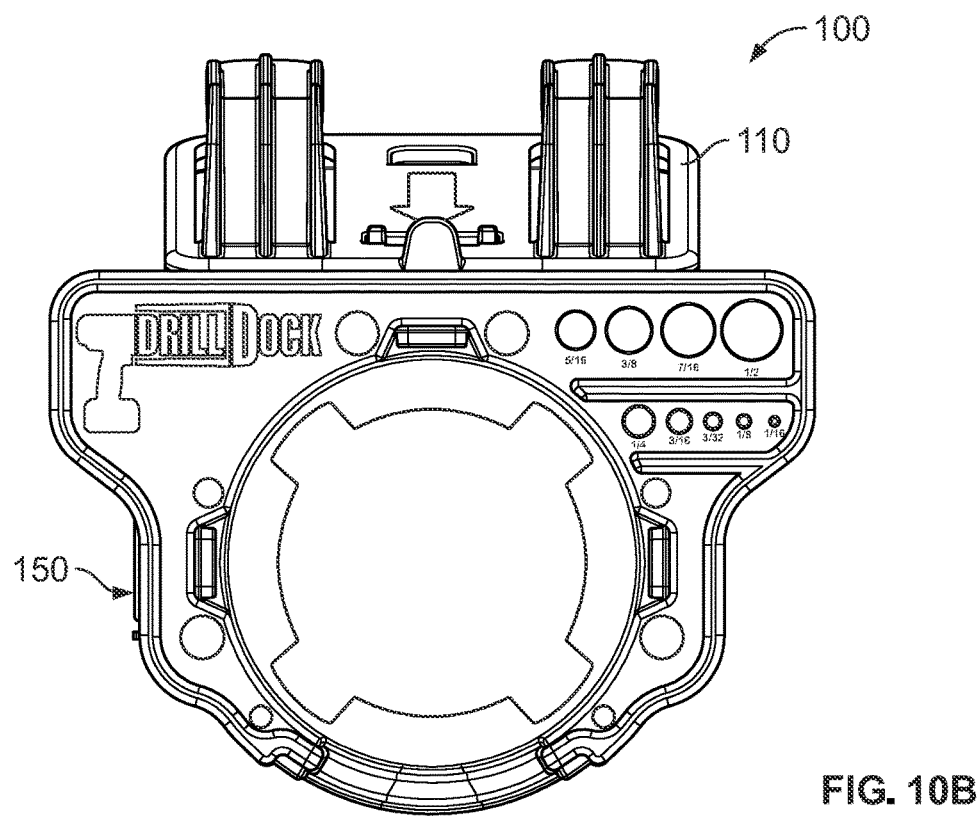
FIG. 10B is a rear-side elevation view the first configuration of tool holder.
Figure 10C:
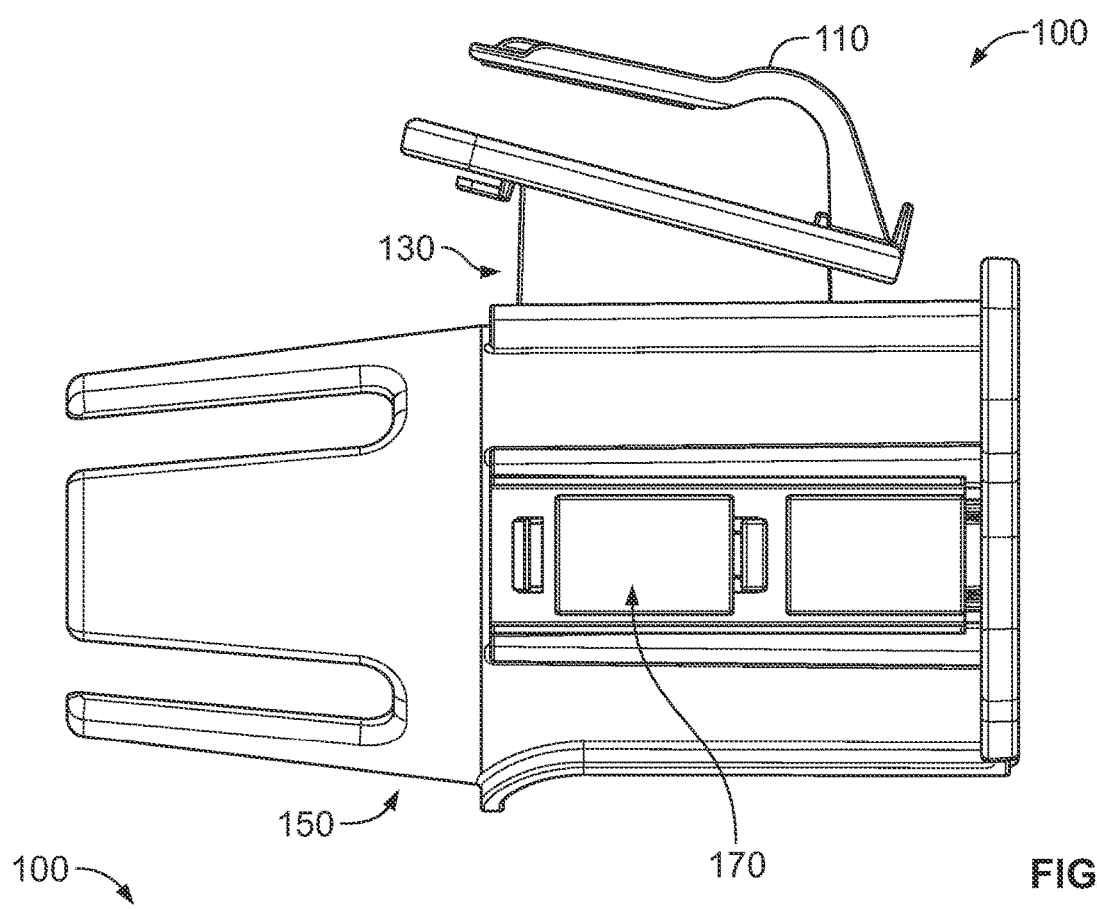
FIG. 10C is a left-side elevation view the first configuration of tool holder.
Figure 10D:
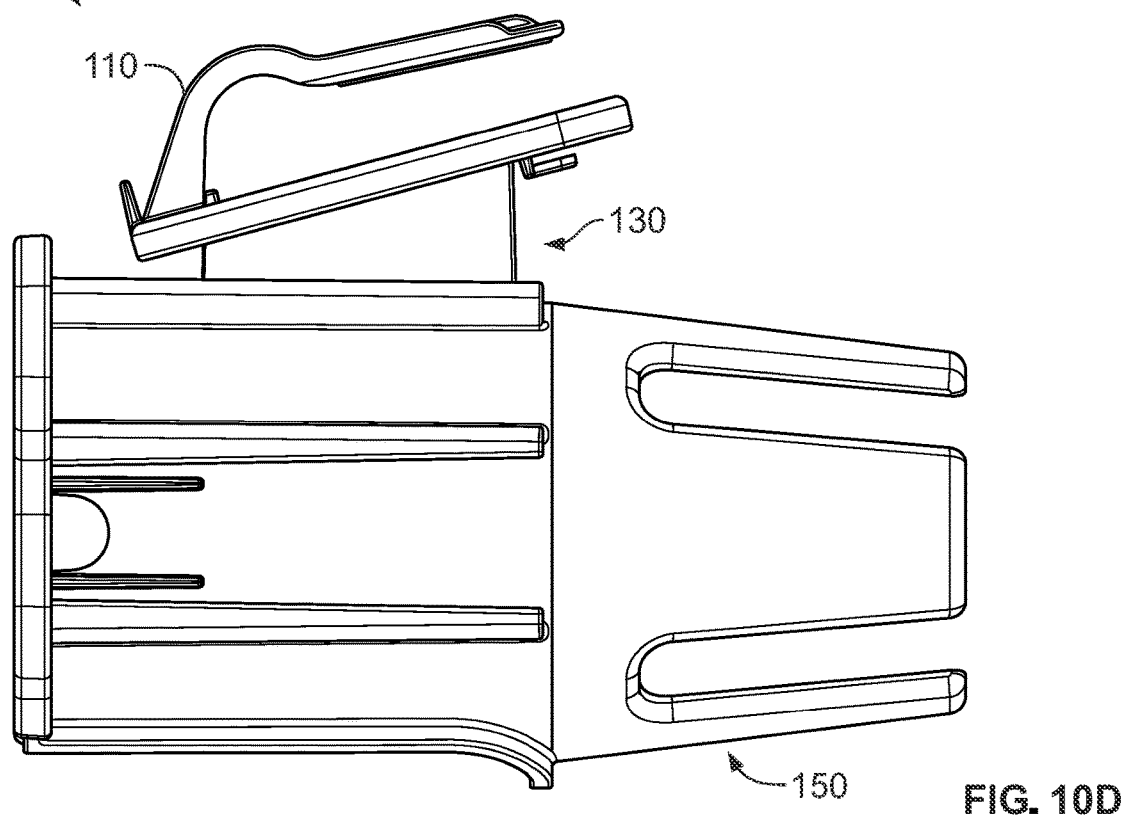
FIG. 10D is a right-side elevation view the first configuration of tool holder.
Figure 10E:
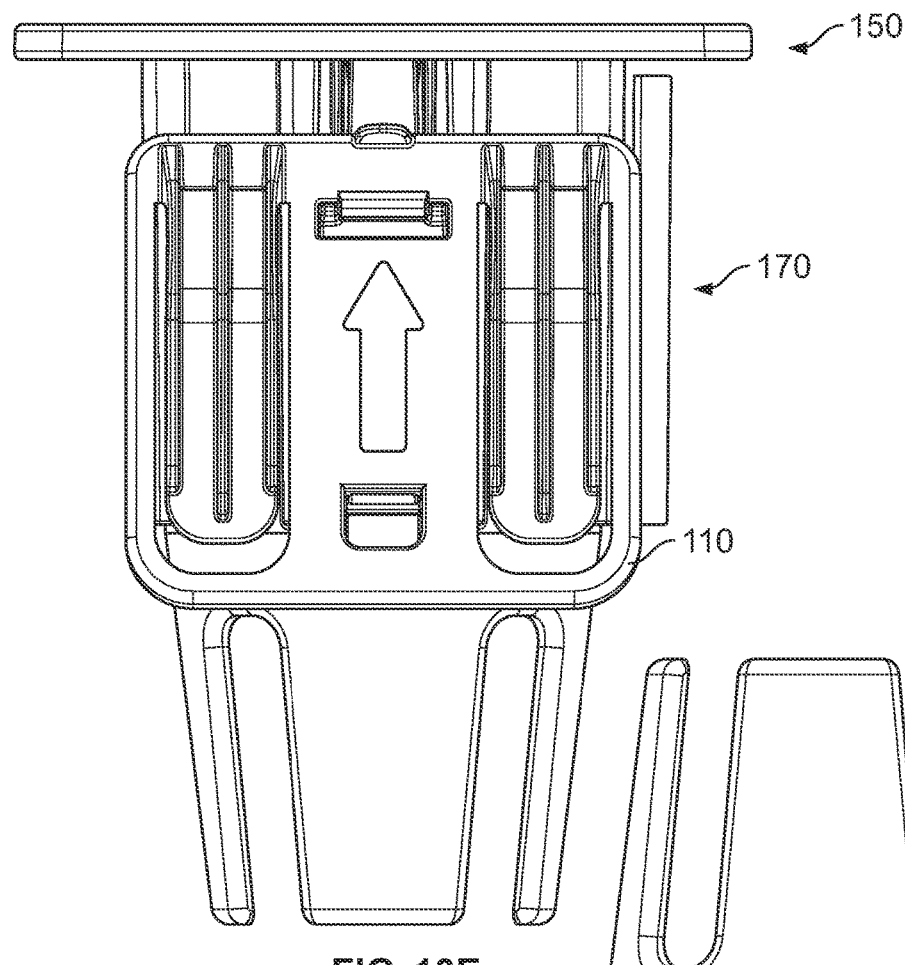
FIG. 10E is a top plan view the first configuration of tool holder.
Figure 10F:
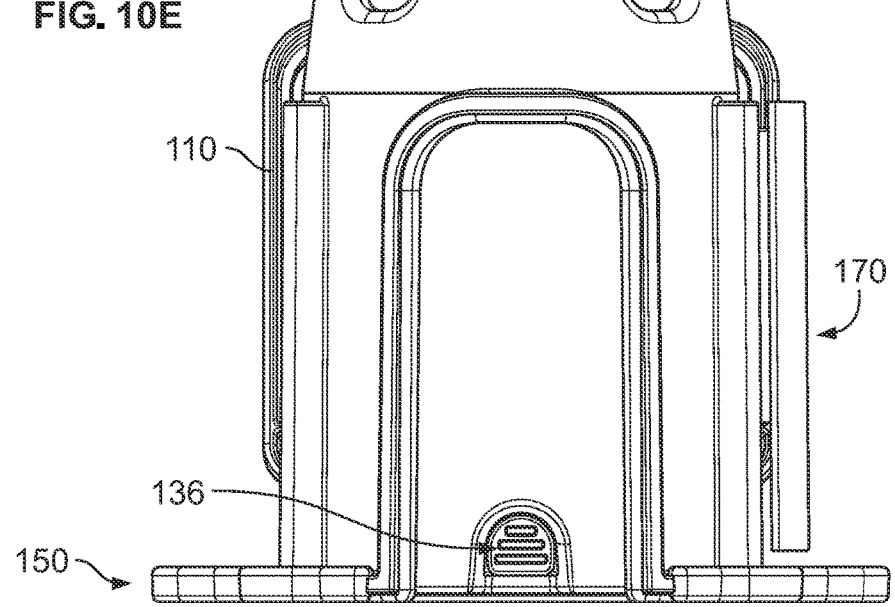
FIG. 10F is a bottom plan view the first configuration of tool holder.

FIGS. 9A and 9B are top and bottom perspective views of magnet assembly 170. FIG. 9C is an exploded view of magnet assembly 170. Magnet assembly 170 includes magnets 171/172, base 174 (which includes runners 176 and 177), spring arm 175, and spring arm head 178. Base 174, runners 176, 177, spring arm 175, and spring arm head 178 operate in a way similar to angled portion 130, runners 131, 132, spring arm 135, and spring arm head 136. The latter set of features are depicted in FIGS. 13A-13D and described below. This disclosure applies to the corresponding features on magnet assembly 170 as well.

Magnet assembly 170 further includes magnet holder 173, which has two apertures 181, 182. These apertures engage with corresponding features in base 174 to attach the magnet holder 173 with base 174. Magnets 171/172 are coupled (e.g., glued) to magnet holder 173. Drill bits and other metal components can be retained by magnets 171, 172.

Magnet assembly 170 is a type of accessory to tool holder 100. Other types of accessories include shelf and bucket clips, bit and driver holders, battery holders, or flashlights. Any such accessory may include features described with respect to magnet assembly 170 or angled portion 130. Such features include runners, spring arm, and spring arm head.

Figure 11:
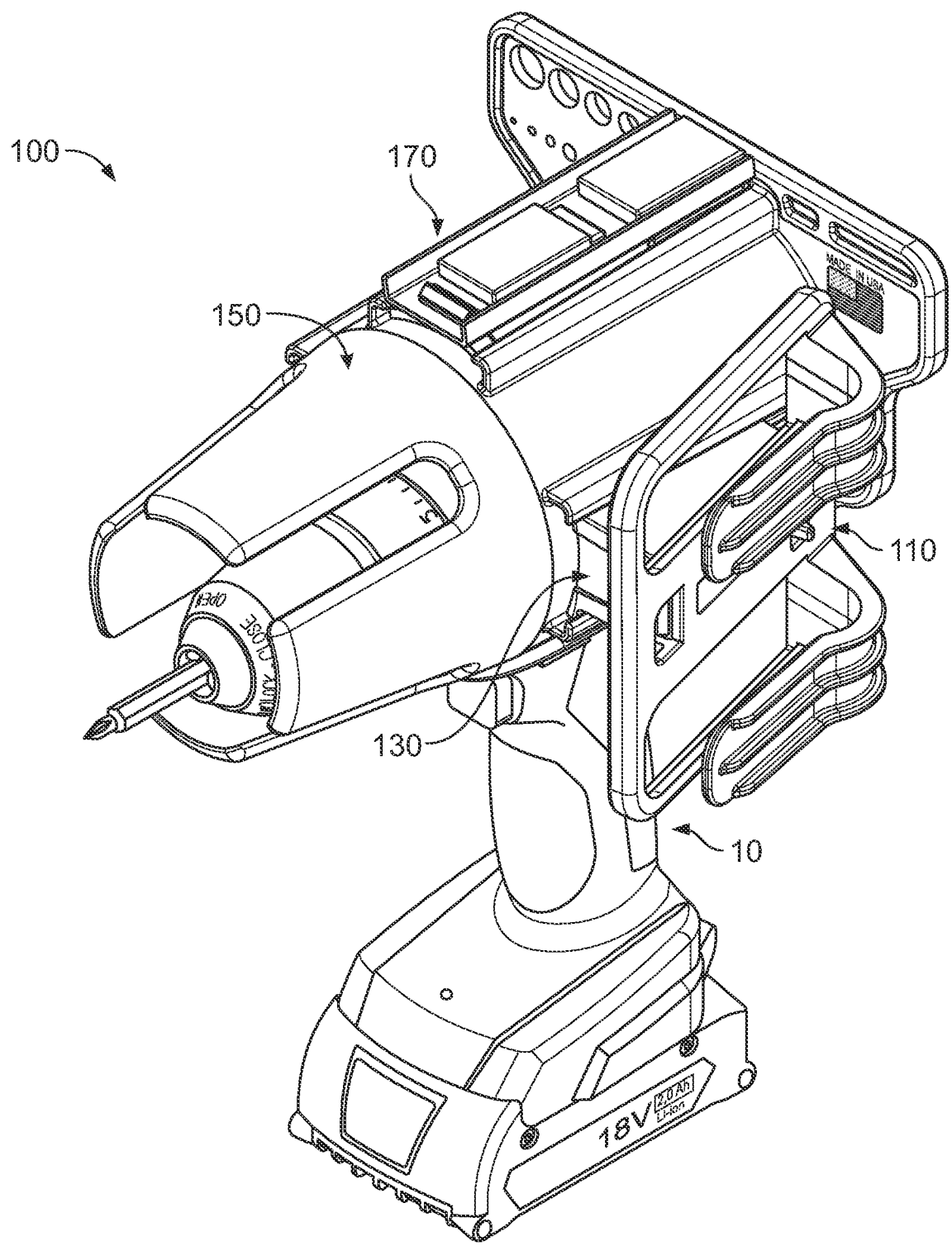
FIG. 11 is a perspective view of a fourth configuration of tool holder.
Figure 12:
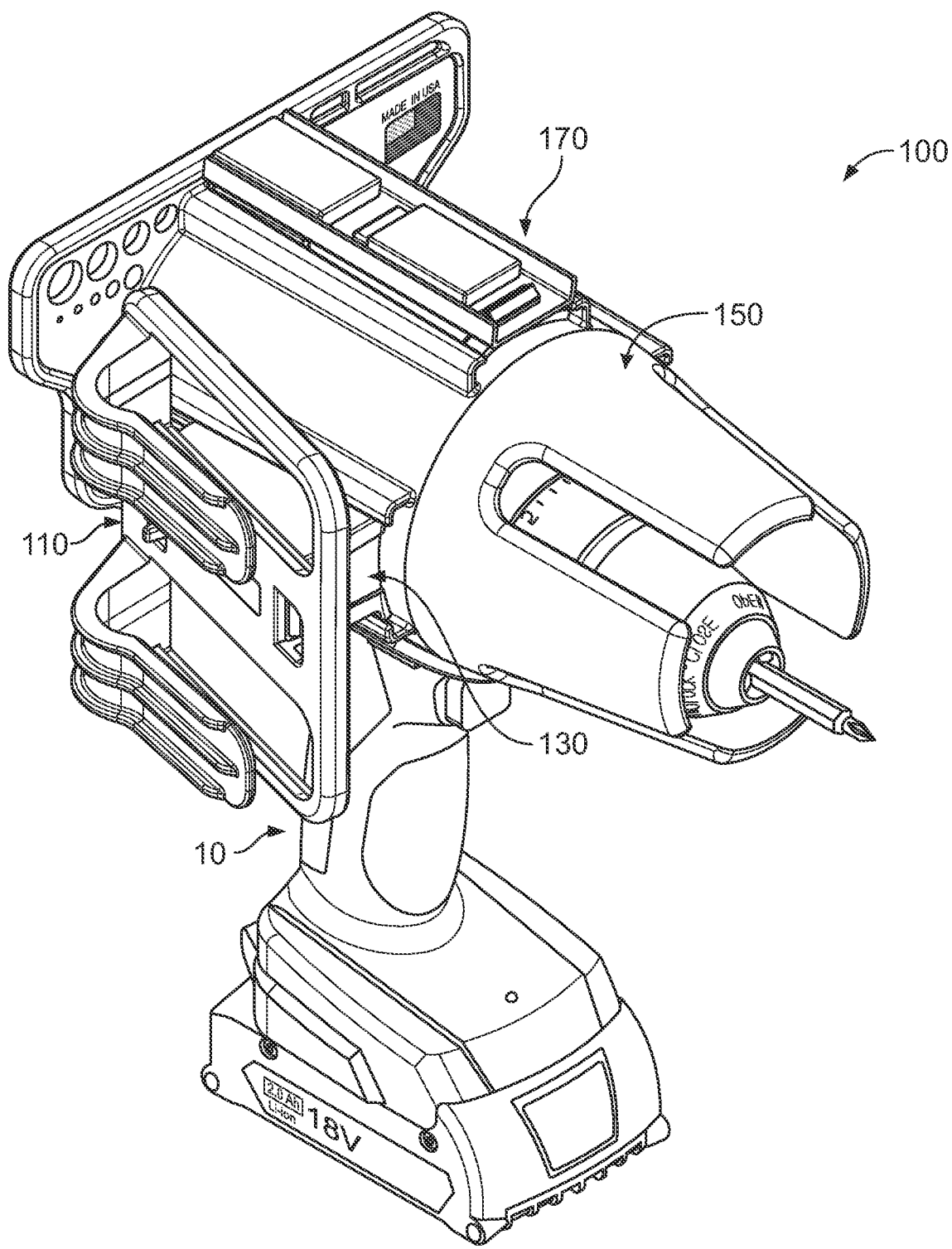
FIG. 12 is a perspective view of a fifth configuration of a tool holder.

FIGS. 10A, 10B, 10C, 10D, 10E, and 10F are different views (front-side elevation, rear-side elevation, left-side elevation, right-side elevation, top plan, and bottom plan, respectively) of the first configuration of tool holder 100 shown in FIGS. 1A, 1B, and 1C. FIG. 11 is a perspective view of a fourth configuration of tool holder 100, in which mount 101 includes clip 110 and angled portion 130 and magnet holder 170. In the fourth configuration, mount 101 is coupled to a lateral side of body 150, and magnet assembly is coupled to the upper side of body 150. FIG. 12 is a perspective view of a fifth configuration of tool holder 100. The fifth configuration of tool holder 100 is identical to the fourth configuration except that mount 101 is coupled to the opposite lateral side of body 150.

FIGS. 13A, 13B, 13C, and 13D shows a sequence illustrating how angled portion 130 connects and disconnects to/from body 150. These figures are cross-sectional views of a portion of tool holder 100. Not shown are rails 153, 154 and stops 155, 156 on body 150. Also not shown are runners 131, 132 on angled portion 130, which engage with rails 153, 154. As described above, this system allows angled portion 130 to slide in and couple to different locations of body 150. FIGS. 13A-13D show more particularly how spring arm 135, spring arm head 136, and aperture 157 work together to allow angled portion to be removably coupled with body 150. This depiction and description also applies to corresponding features of magnet assembly 170, thereby allowing magnet assembly 170 to be removably coupled with body 150.

Figure 13A:
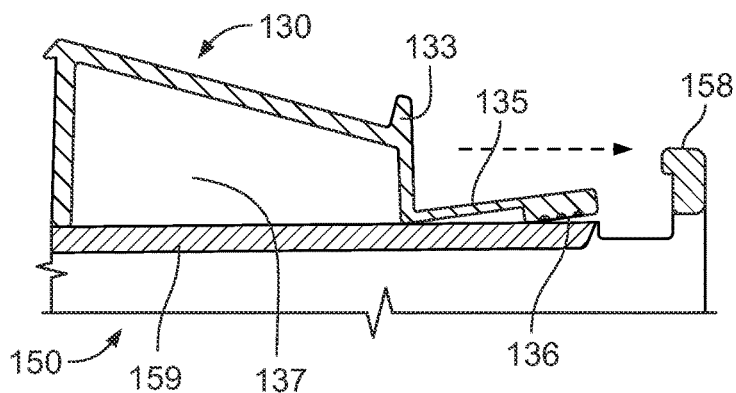
FIGS. 13A, 13B, 13C, and 13D shows a sequence illustrating how angled portion connects and disconnects to/from body.
Figure 13B:
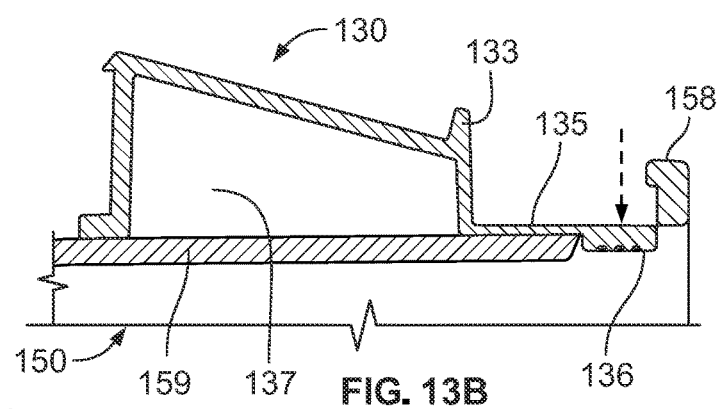
Figure 13C:
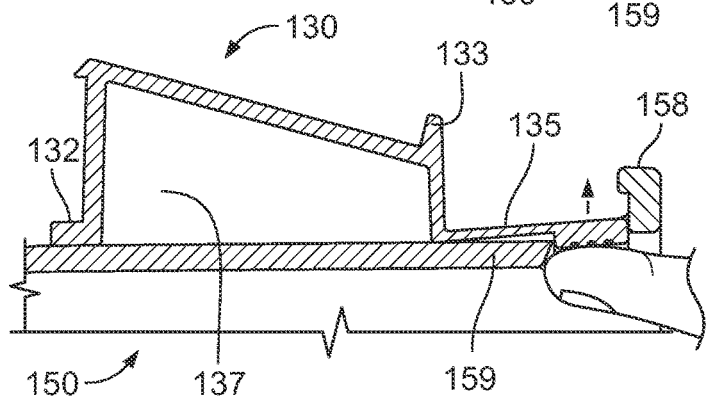
Figure 13D:
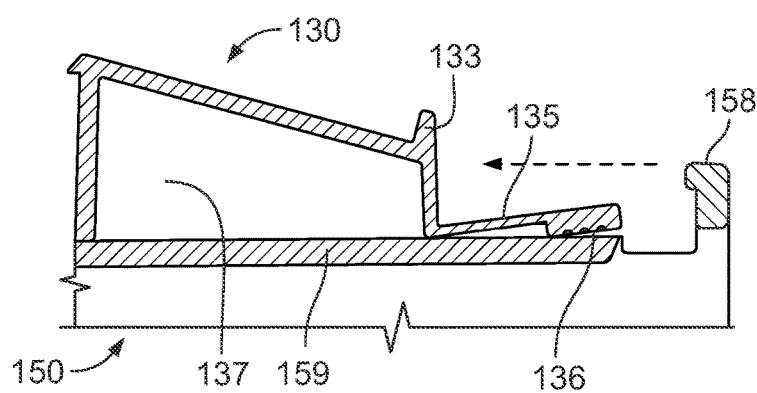

In FIG. 13A, angled portion 130 is pushed along body 150 towards plate 158. Spring arm head 136 contacts tubular portion 159 of body 150, thereby upwardly deflecting and compressing spring arm 135. In FIG. 13B, when spring arm head 136 reaches aperture 157 in body 150, spring arm 135 decompresses and spring arm 136 drops into aperture 157. In FIG. 13C, a user places a finger into the underside of aperture 157, thereby pushing spring arm 136 head upwardly and out of aperture 157. As shown in FIG. 13D, angled portion 130 can then be moved back, such that it can be removed from body 150.

Figure 14B:
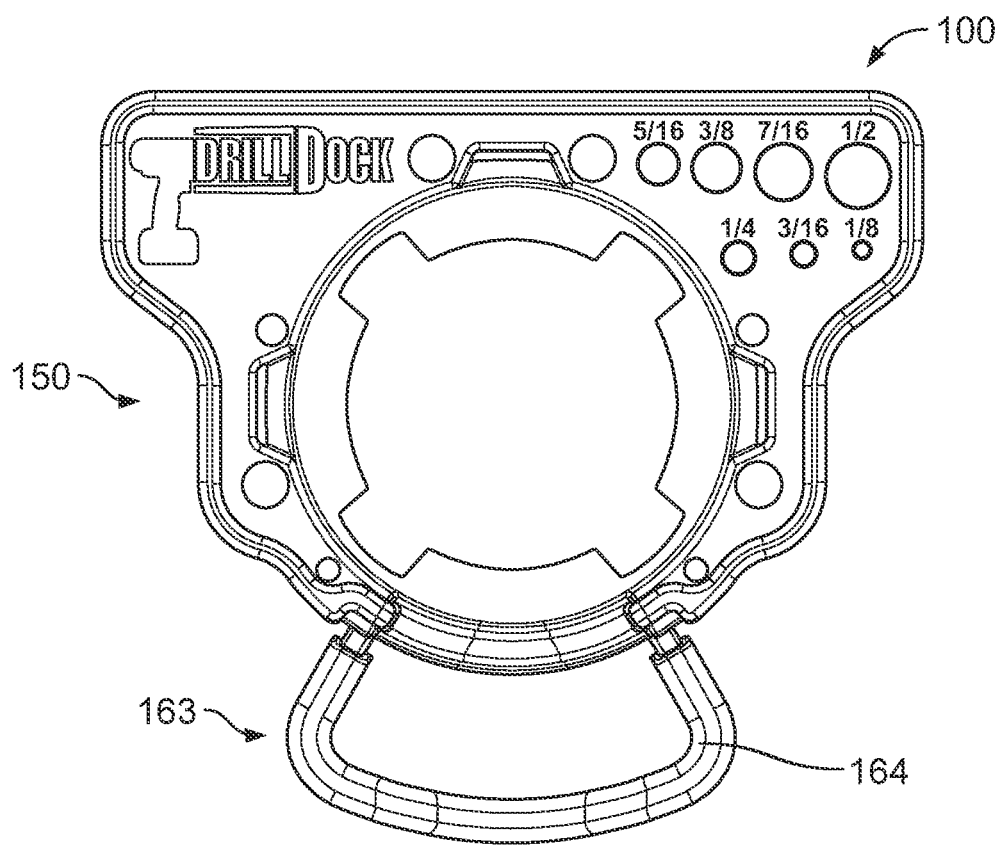
FIG. 14B is a rear-side elevation view of tool holder with a triggering-prevention portion.
Figure 15:
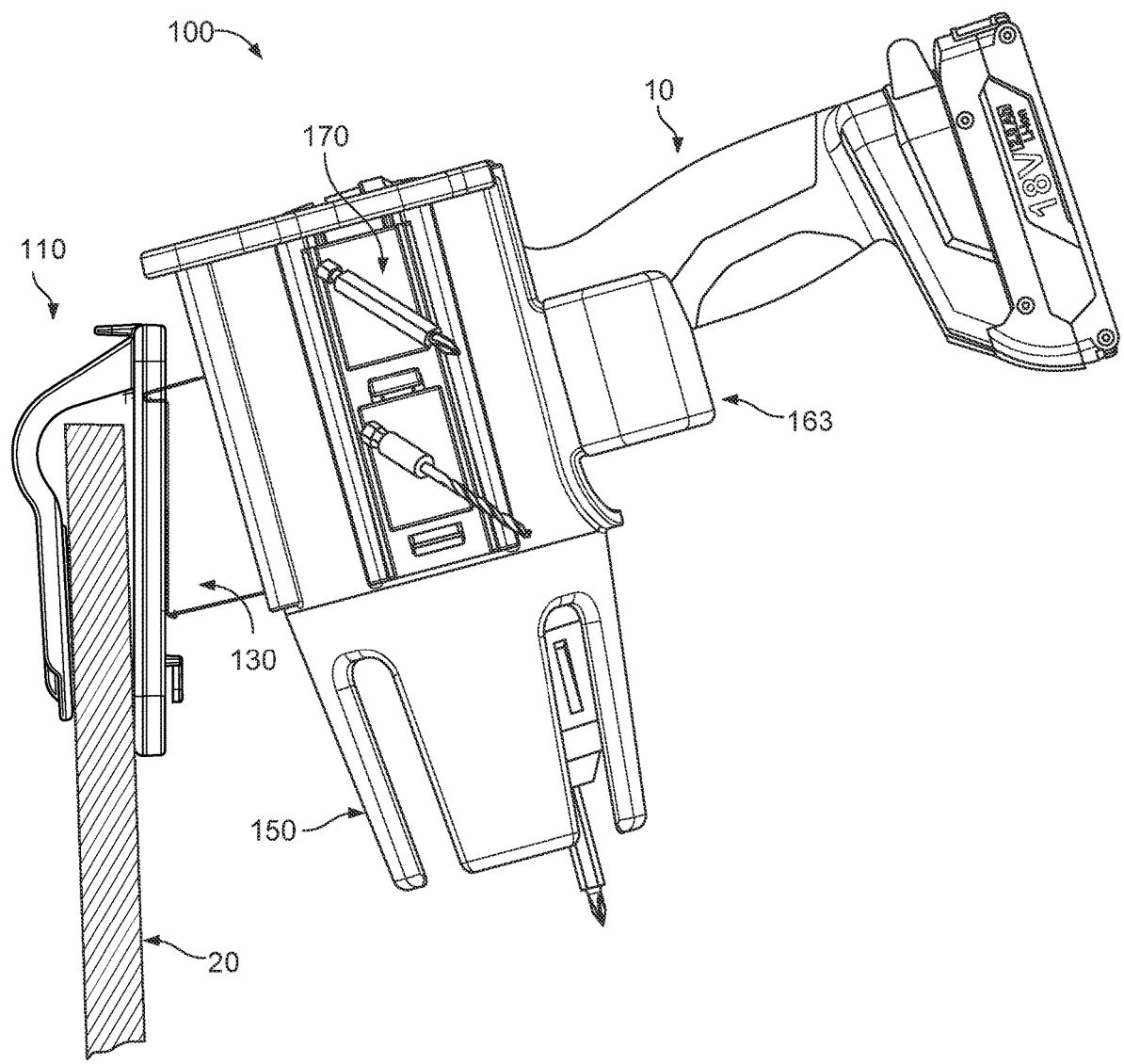
FIG. 15 is an elevation view of tool holder with a triggering-prevention portion, where tool holder is shown holding a drill.

FIG. 14A is a perspective view of tool holder 100 with triggering-prevention portion 163. FIG. 14B is a rear-side elevation view of tool holder 100 with triggering-prevention portion 163. FIG. 15 is an elevation view of tool holder 100 with triggering-prevention portion 163, where tool holder 100 is shown holding a drill 10. Triggering-prevention portion 163 has a U-shape, thereby forming an interior region. Triggering-prevention portion 163 includes receiving surface 164. When a tool such as drill 10 is received by tool holder 100, at least a portion of the tool rests against or abuts receiving surface 164 of triggering-prevention portion 163. The portion of the tool that abuts receiving surface 164 (e.g., the handle of tool, as shown in FIG. 15) is not a trigger of the tool. Instead the trigger will be positioned at least partially within interior region of triggering-prevention portion 163. In such a way, inadvertent activation of a tool is prevented when the tool is received by tool holder 100. Receiving surface 164 may include an overmold material that is softer and reduces undesirable effects of any impact or rubbing between triggering-prevention portion 163 and the tool. Triggering-prevention portion 163 is shown as integrated with body 150, but may be one or more separable portions.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A tool holder for holding a tool, comprising:
   a body including an interior region configured to receive the tool, wherein the tool defines a primary axis;
   a mount coupled to the body, wherein the mount is configured to secure the tool holder to an object other than the tool itself; and
   a triggering-prevention portion coupled to the body, wherein the triggering-prevention portion is configured to prevent a trigger of the tool from being engaged when the tool is held by the tool holder.

2. The tool holder of claim 1, wherein the triggering-prevention portion is removably coupled to the body.

3. The tool holder of claim 1, wherein the triggering-prevention portion comprises a U-shape extending outwardly from a lateral surface of the body, wherein the U-shape defines an interior region.

4. The tool holder of claim 3, wherein when the tool is received by the body, the trigger of the tool is positioned at least partially within the interior region of the triggering-prevention portion.

5. The tool holder of claim 1, wherein the triggering-prevention portion comprises a receiving surface, wherein the receiving surface is configured to receive a portion of the tool that is not a trigger of the tool.

6. The tool holder of claim 5, wherein the receiving surface is configured to receive a handle of the tool.

7. The tool holder of claim 1, wherein the tool comprises a drill.

8. The tool holder of claim 1, wherein the triggering-prevention portion extends across an opening in the body.

9. The tool holder of claim 8, wherein the opening in the body is configured to receive a handle of the tool.

10. The tool holder of claim 1, wherein the triggering-prevention portion comprises an overmold material that is softer than another portion of the triggering-prevention portion, wherein the overmold material is configured to engage with the tool.

11. A tool holder for holding a tool, comprising:
a body including an interior region configured to receive the tool, wherein the tool defines a primary axis;
a mount including an angled portion, wherein the mount is coupled to the body, wherein the mount is configured to be secured to an object other than the tool itself, and wherein the a region of object where the mount is secured defines a primary axis, and
wherein the mount maintains the body in an orientation such that when the body receives the tool and mount is secured to the object, the primary axis of the tool and the primary axis of the object form an oblique angle in which the primary axis of the tool extends outwardly, away from the primary axis of object in a dimension perpendicular to the primary axis of the object; and
a triggering-prevention portion coupled to the body, wherein the triggering-prevention portion is configured to prevent a trigger of the tool from being engaged when the tool is held by the tool holder.

12. The tool holder of claim 11, wherein the triggering-prevention portion is removably coupled to the body.

13. The tool holder of claim 11, wherein the triggering-prevention portion comprises a U-shape extending outwardly from a lateral surface of the body, wherein the U-shape defines an interior region.

14. The tool holder of claim 13, wherein when the tool is received by the body, the trigger of the tool is positioned at least partially within the interior region of the triggering-prevention portion.

15. The tool holder of claim 11, wherein the triggering-prevention portion comprises a receiving surface, wherein the receiving surface is configured to receive a portion of the tool that is not a trigger of the tool.

16. The tool holder of claim 15, wherein the receiving surface is configured to receive a handle of the tool.

17. The tool holder of claim 11, wherein the tool comprises a drill.

18. The tool holder of claim 11, wherein the triggering-prevention portion extends across an opening in the body.

19. The tool holder of claim 18, wherein the opening in the body is configured to receive a handle of the tool.

20. The tool holder of claim 11, wherein the triggering-prevention portion comprises an overmold material that is softer than another portion of the triggering-prevention portion, wherein the overmold material is configured to engage with the tool.

* * * * *